(12) United States Patent
Stiffler et al.

(10) Patent No.: US 9,299,050 B2
(45) Date of Patent: Mar. 29, 2016

(54) SYSTEM AND METHOD OF REPRESENTING BUSINESS UNITS IN SALES PERFORMANCE MANAGEMENT USING ENTITY TABLES CONTAINING EXPLICIT ENTITY AND INTERNAL ENTITY IDS

(75) Inventors: Mark A. Stiffler, Singapore (SG); Anne Luongo, Philadelphia, PA (US); Vinit Manjardekar, Wayne, PA (US); Marissa Arney, Philadelphia, PA (US); Andrew Cohen, West Chester, PA (US)

(73) Assignee: Optymyze PTE Ltd., Singapore (SG)

( * ) Notice: Subject to any disclaimer, the term of this patent is extended or adjusted under 35 U.S.C. 154(b) by 444 days.

(21) Appl. No.: 13/602,423

(22) Filed: Sep. 4, 2012

(65) Prior Publication Data

US 2014/0068404 A1 Mar. 6, 2014

(51) Int. Cl.
*H03M 5/00* (2006.01)
*G06Q 10/06* (2012.01)
*G06F 17/24* (2006.01)

(52) U.S. Cl.
CPC .......... *G06Q 10/0639* (2013.01); *G06F 17/243* (2013.01); *G06F 17/245* (2013.01)

(58) Field of Classification Search
CPC .... G06F 17/245; G06F 17/246; G06F 17/211
USPC ........................................................ 715/227
See application file for complete search history.

(56) References Cited

U.S. PATENT DOCUMENTS

| | | | | |
|---|---|---|---|---|
| 5,499,371 A | * | 3/1996 | Henninger et al. | ............ 717/108 |
| 5,548,749 A | * | 8/1996 | Kroenke et al. | |
| 5,724,577 A | * | 3/1998 | Exley et al. | |
| 6,058,391 A | * | 5/2000 | Gardner | |
| 6,834,282 B1 | | 12/2004 | Bonneau et al. | |
| 6,839,701 B1 | * | 1/2005 | Baer | ................. G06F 17/30011 |
| 6,907,414 B1 | | 6/2005 | Parnell | |
| 6,925,468 B1 | | 8/2005 | Bobbitt et al. | |
| 6,970,844 B1 | | 11/2005 | Bierenbaum | |
| 7,203,701 B1 | | 4/2007 | Packebush et al. | |
| 7,363,593 B1 | | 4/2008 | Loyens et al. | |
| 7,451,352 B1 | * | 11/2008 | Moore et al. | ................ 714/38.14 |
| 7,908,304 B2 | | 3/2011 | Chao et al. | |
| 7,958,024 B2 | | 6/2011 | Chao et al. | |
| 8,478,616 B2 | * | 7/2013 | De Klerk et al. | ............ 705/7.11 |
| 2002/0161757 A1 | * | 10/2002 | Mock | ................. G06F 17/30386 |
| 2003/0120711 A1 | * | 6/2003 | Katz | .............................. 709/106 |
| 2005/0027724 A1 | * | 2/2005 | Minamino et al. | ............ 707/100 |
| 2010/0191702 A1 | * | 7/2010 | Hofmann | ....................... 707/616 |
| 2011/0213816 A1 | * | 9/2011 | Doshi | ................ G06F 17/30194 707/827 |
| 2012/0151338 A1 | * | 6/2012 | Forsberg | ........... G06F 17/30905 715/273 |
| 2013/0007062 A1 | * | 1/2013 | Dutta et al. | .................... 707/792 |

\* cited by examiner

*Primary Examiner* — Cesar Paula
*Assistant Examiner* — Luu-Phuong Nguyen
(74) *Attorney, Agent, or Firm* — Panitch Schwarze Belisario & Nadel LLP

(57) ABSTRACT

A computer-implemented method is disclosed having the steps of receiving a user input selecting an entity name, and generating an entity table associated with the entity name and configured to store data related to a business unit. The method further includes the steps of populating the entity table with unique explicit entity ID values, generating a unique internal entity ID value for each one of the explicit entity ID values, associating each internal entity ID value with a corresponding one of the explicit entity ID values, and storing the internal entity ID values in the entity table. The entity table is associated with a separate data table such that at least one of the explicit entity ID values is displayed, but not stored, in an ID field of the data table, while the corresponding associated internal entity ID value is stored in the data table but not displayed.

20 Claims, 25 Drawing Sheets

| Internal Entity ID Field | Explicit Entity ID Field (Employee ID) | First Entity Attribute Field (Employee Name) | Second Entity Attribute Field (Employee Address) | Third Entity Attribute Field (Employee Status) |
|---|---|---|---|---|
| 101 | 0001 | Name 1 | Address 1 | Full Time |
| 102 | 0002 | Name 2 | Address 2 | Full Time |
| 103 | 0003 | Name 3 | Address 3 | Part Time |
| 104 | 0004 | Name 4 | Address 4 | On Leave |
| 105 | 0005 | Name 5 | Address 5 | Full Time |

FIG. 4

| ID Display Field (Employee ID) | Entity Attribute Display Field (Employee Name) | First Table Data Field (Annual Salary) | Second Table Data Field (Bonus Eligibility) |
|---|---|---|---|
| 0001 | Name 1 | $50,000 | Yes |
| 0002 | Name 2 | $55,000 | Yes |
| 0003 | Name 3 | $40,000 | No |
| 0004 | Name 4 | $60,000 | No |
| 0005 | Name 5 | $55,000 | Yes |

FIG. 10A

| ID Storage Field (Internal Entity ID) | First Table Data Field (Annual Salary) | Second Table Data Field (Bonus Eligibility) |
|---|---|---|
| 101 | $50,000 | Yes |
| 102 | $55,000 | Yes |
| 103 | $40,000 | No |
| 104 | $60,000 | No |
| 105 | $55,000 | Yes |

SYSTEM AND METHOD OF REPRESENTING BUSINESS UNITS IN SALES PERFORMANCE MANAGEMENT USING ENTITY TABLES CONTAINING EXPLICIT ENTITY AND INTERNAL ENTITY IDS

FIELD OF INVENTION

This application is generally related to methods and systems for representing and analyzing business processes and transactions, and more particularly related to a computerized method and system for representing business units that are frequently used in sales performance management solutions by using entity tables.

BACKGROUND

Sales performance management (SPM) solutions allow companies to track and analyze their sales data and other business data in various ways. Within the SPM field, there are many different and interrelated business applications, including sales compensation management (SCM) solutions, sales analytics, data management, workflow processes, etc. SPM solutions, including computer software, can be used to manage a company's compensation plans, data analysis, and other operation functions, and provide different individuals within the company with customized information related to performance and compensation. To effectively represent business processes and support complex data calculations, SPM solutions generally utilize data repositories that store numerous tables, each of which contains various data fields relevant to those processes and calculations. The vast amount of input and output data used in SPM software requires large storage and processing capabilities. Typically, many of the same data fields may be repeated across different data tables to present the same data values, which are used in conjunction with other data values in different performance management elements or calculations.

In known SPM solutions, storing the same sets of data in the same data fields across different tables results in the need for extra storage space and inefficiencies when data values in a field are updated, since the change must be made in every table that includes the same field. It can also be difficult to ensure that data values in the same fields in different tables are both "valid" (i.e. the correct data values for the business context) and "in synch" (i.e. consistent across the different tables). Furthermore, tables that contain the same data fields and sets of data in known SPM solutions are not inherently related in the system, and must be manually associated with each other by the user. Therefore, a need exists for technology that offers a more business oriented and efficient method of managing data used in SPM and other performance management solutions.

SUMMARY

A computer-implemented method of representing and utilizing data related to a business unit in a sales performance management system is disclosed. The computer-implemented method including the steps of receiving a user input selecting an entity name representing the business unit, and generating an entity table that is associated with the entity name and configured to store data related to the business unit in a storage device. The entity table contains data fields including an explicit entity ID field and an internal entity ID field. The method further includes the steps of populating the explicit entity ID field of the entity table with explicit entity ID values that each uniquely identifies an instance of the business unit, wherein no two explicit entity ID values are identical, generating a unique internal entity ID value for each one of the explicit entity ID values, and associating each internal entity ID value with a corresponding one of the explicit entity ID values. The internal entity ID values are stored in the internal entity ID field of the entity table. The entity table is associated with a data table, separate from the entity table, such that at least one of the explicit entity ID values is displayed, but not stored, in an ID field of the data table via a display device. The corresponding internal entity ID value associated with the at least one explicit entity ID value is stored in the data table, but is not displayed.

A system for representing and utilizing data related to a business unit in sales performance management is also disclosed, the system having a processor, a storage device in communication with the processor, a display device in communication with the processor and configured to present a graphical user interface, an input device in communication with at least one of the processor, the storage device, or the display device, and a software stored in the storage device and executable by the processor. The software includes a component configured to receive a user input from the input device selecting an entity name representing the business unit, and a component configured to generate an entity table that is associated with the entity name and configured to store data related to the business unit in the storage device. The entity table contains data fields including an explicit entity ID field and an internal entity ID field. The software further includes a component configured to receive a data input of explicit entity ID values that each uniquely identifies an instance of the business unit, wherein no two explicit entity ID values are identical, and to store the explicit entity ID values in the explicit entity ID field of the entity table. Another software component is configured to generate a unique internal entity ID value for each one of the explicit entity ID values, and to associate each internal entity ID value with a corresponding one of the explicit entity ID values. The software also includes a component configured to store the internal entity ID values in the internal entity ID field of the entity table, and a component configured to associate the entity table with the data table. When a user input selecting at least one explicit entity ID value is received via the input device, the user selected at least one explicit entity ID value is displayed, but not stored, in the ID field of the data table via the display device, while the corresponding internal entity ID value associated with the user selected at least one explicit entity ID value is stored in the data table, but is not displayed.

A computer software product that includes a non-transitory computer readable storage medium readable by a processor is also disclosed. A set of instructions for representing and utilizing data related to a business unit in a sales performance management system is stored on the non-transitory computer readable storage medium. The instructions include a first sequence of instructions which, when executed by the processor, causes the processor to receive a user input selecting an entity name representing the business unit. A second sequence of instructions are executable by the processor to generate an entity table that is associated with the entity name and configured to store data related to the business unit in a storage device, the entity table having data fields including an explicit entity ID field and an internal entity ID field. A third sequence of instructions are executable by the processor to populate the explicit entity ID field of the entity table with explicit entity ID values that each uniquely identifies an instance of the business unit, wherein no two explicit entity ID values are identical. The instructions further include a fourth sequence of instructions executable by the processor to generate a unique internal entity ID value for each one of the explicit entity ID values, a fifth sequence of instructions executable by the processor to associate each internal entity ID value with a corresponding one of the explicit entity ID values, and a sixth sequence of instructions executable by the processor to store the internal entity ID values in the internal entity ID field of the entity table. The instructions also include a seventh sequence of instructions which, when executed by the processor, causes the processor to associate the entity table with a data table, separate from the entity table, such that at least one of the explicit entity ID values is displayed, but not stored, in an ID field of the data table via a display device. The corresponding internal entity ID value associated with the at least one explicit entity ID value is stored in the data table, but is not displayed via the display device.

For sake of brevity, this summary does not list all aspects of the present method, system, and computer software product, which are described in further detail below and in the claims.

BRIEF DESCRIPTION OF THE DRAWINGS

The foregoing summary, as well as the following detailed description of the preferred embodiments, will be better understood when read in conjunction with the appended drawings. For the purpose of illustrating the invention, there is shown in the drawings embodiments which are presently preferred. It should be understood, however, that the invention is not limited to the precise arrangement shown.

FIG. 4 illustrates an exemplary entity table;

FIG. 10A illustrates data displayed in an exemplary data table that utilizes an entity;

FIG. 10B illustrates data stored in the exemplary data table of FIG. 10A;

FIG. 12 is a screenshot illustrating data displayed in an exemplary data table that utilizes two different entities;

FIG. 17 is a screenshot illustrating data displayed in an exemplary assignment table;

DETAILED DESCRIPTION OF THE PREFERRED EMBODIMENTS

Figure 1A:
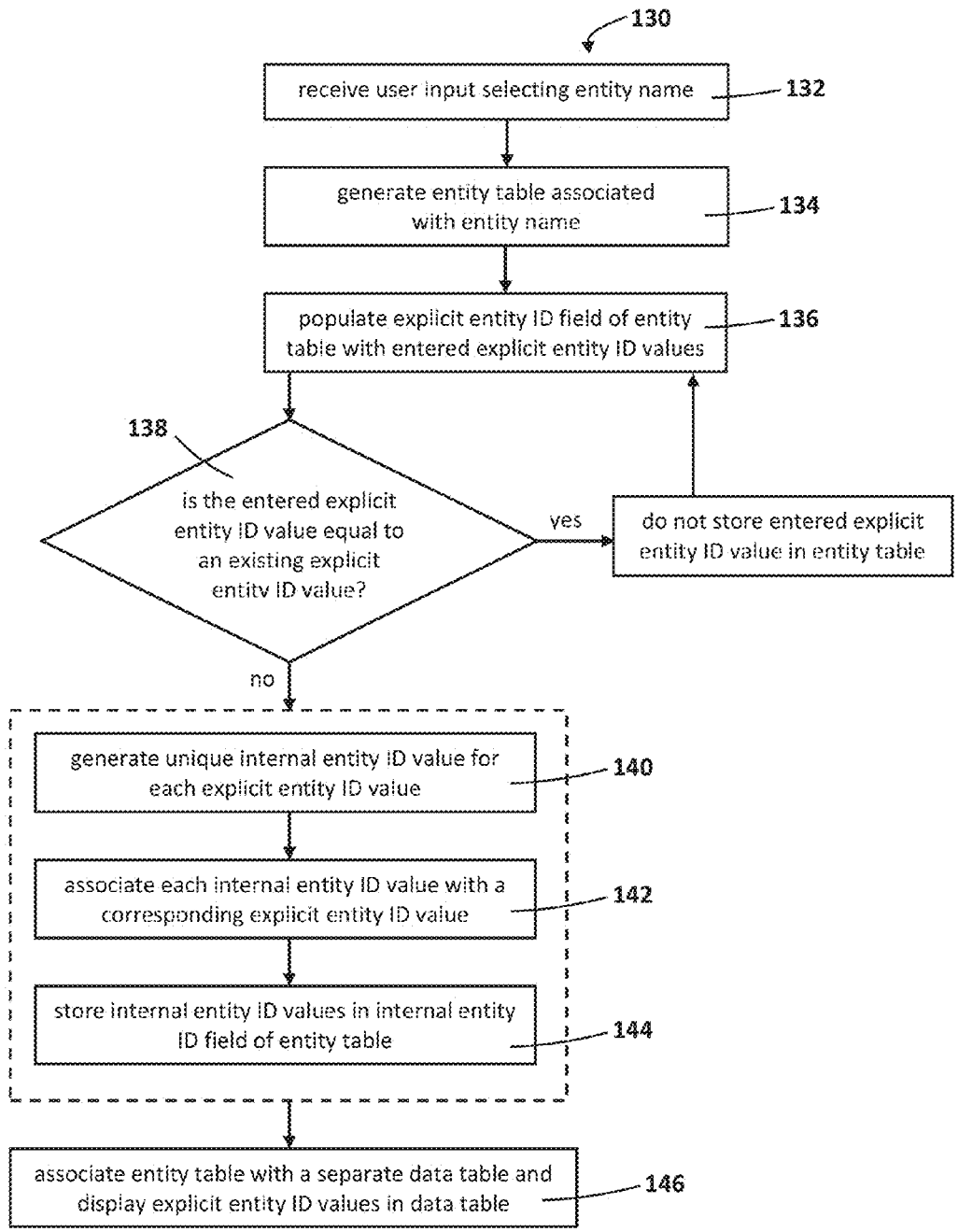
FIG. 1A is a flow diagram illustrating a computer-implemented method of representing and utilizing data related to a business unit in a sales performance management system.

It is to be understood that the figures and descriptions of the present application have been simplified to illustrate elements that are relevant for a clear understanding of the present invention, while eliminating, for the purpose of clarity, many other elements found in business software and computing systems. One of ordinary skill in the art may recognize that other elements and steps may be desired or required in implementing the present system, method, and computer software product. However, because such elements and steps are well known in the art, a discussion of such elements and steps would not facilitate a better understanding of the present invention and thus is not provided herein. The disclosure herein is directed to all such variations and modifications to such methods and steps known to those skilled in the art.

Certain terminology is used in the following description for convenience only and is not limiting. The words "top," "bottom," "left," and "right" designate directions in the drawings to which reference is made. Additionally, the terms "a" and "one" are defined as including one or more of the referenced item unless specifically noted otherwise. A reference to a list of items that are cited as "at least one of a, b, or c" (where a, b, and c represent the items being listed) means any single one of the items a, b, or c, or combinations thereof. The terminology includes the words specifically noted above, derivatives thereof, and words of similar import.

Sales performance management (SPM) systems in the form of computer software allow large amounts of data and complex calculations to be carried out accurately and quickly, and presented to members of an organization in a manner best suited to each individual's position and goals within the organization. SPM systems may include a number of different, but interrelated business applications that represent and carry out various business processes. For example and without limitation, these business processes may be used to determine the performance of individuals and sales channels within the organization, to analyze performance metrics in combination with other data to improve, recognize, and reward performance, and to improve the efficiency and productivity of sales operations and other business functions. Additional examples of SPM business applications include general data management, which may include processes for extracting, loading, transforming, and validating data used by the SPM system, and analyzing data processing performances of the system.

Sales analytics applications may be used to analyze and interpret various sales related data to determine specific issues and recommend areas for processes or performance improvement. SPM applications may further include workflow process management, which may be used to define the requirements for initiating workflow processes, specify and manage the workflow routing processes, and analyze the effectiveness of workflow processes. Workflow process functionalities may be embedded with other applications to carry out various sequences of business operations. Additional business applications may be related to reporting capabilities, such as the reporting of sales and other business information through static reports as well as dynamically created reports in real time. Individualized alerts and dashboards may be included in SPM systems to provide users with customized messages, data representations, what-if calculators, and other dynamic views that provide insight into business performance.

In addition, a subset of SPM business processes may be specifically related to sales compensation management (SCM), which focuses on the management of sales compensation for salespeople and other sales channels. SCM application may include solutions directed to the areas of compensation planning, merit adjustments, crediting and eligibility, commissions and variable pay, rewards and recognition, disputes and inquiries, auditing and compliance, and modeling and simulation of sales or compensation plans. Embodying such SCM applications in software is advantageous over homegrown solutions, such as spreadsheet based systems, in that the software may be configured to represent customized compensation plans and associated processes, import data relevant to those plans and processes, and perform necessary manipulations and calculations on such data to generate useful results for the end user. SPM software may include representations and analysis of common SCM components, including for example and without limitation, processes and calculations related to sales quotas, attainments, earnings, commissions, draws, eligibility considerations, forecasts, payouts, and various performance measures. The present computer-implemented method, system, computer software product, and related technologies may be used in such SPM software to help minimize inefficiencies with respect to the same sets of data used across different data tables, and to provide a more streamlined and business oriented approach to data management.

It is to be understood that although the present invention is described within the context of a general SPM system, the principles embodied herein may be broadly applied to any performance management or other business solution utilizing business units that have special meaning for an organization and thus may be represented as entities. Accordingly, the term "sales performance management system" as used herein should not be interpreted as a system limited to or requiring the use of sales related processes or data. Similarly, while many of the examples in this application deal with sales related processes and information, one of ordinary skill in the art would appreciate that the present invention is not restricted to sales-centric applications, and may be used in a wide array of business solutions with various types of business units and data.

Figure 2:
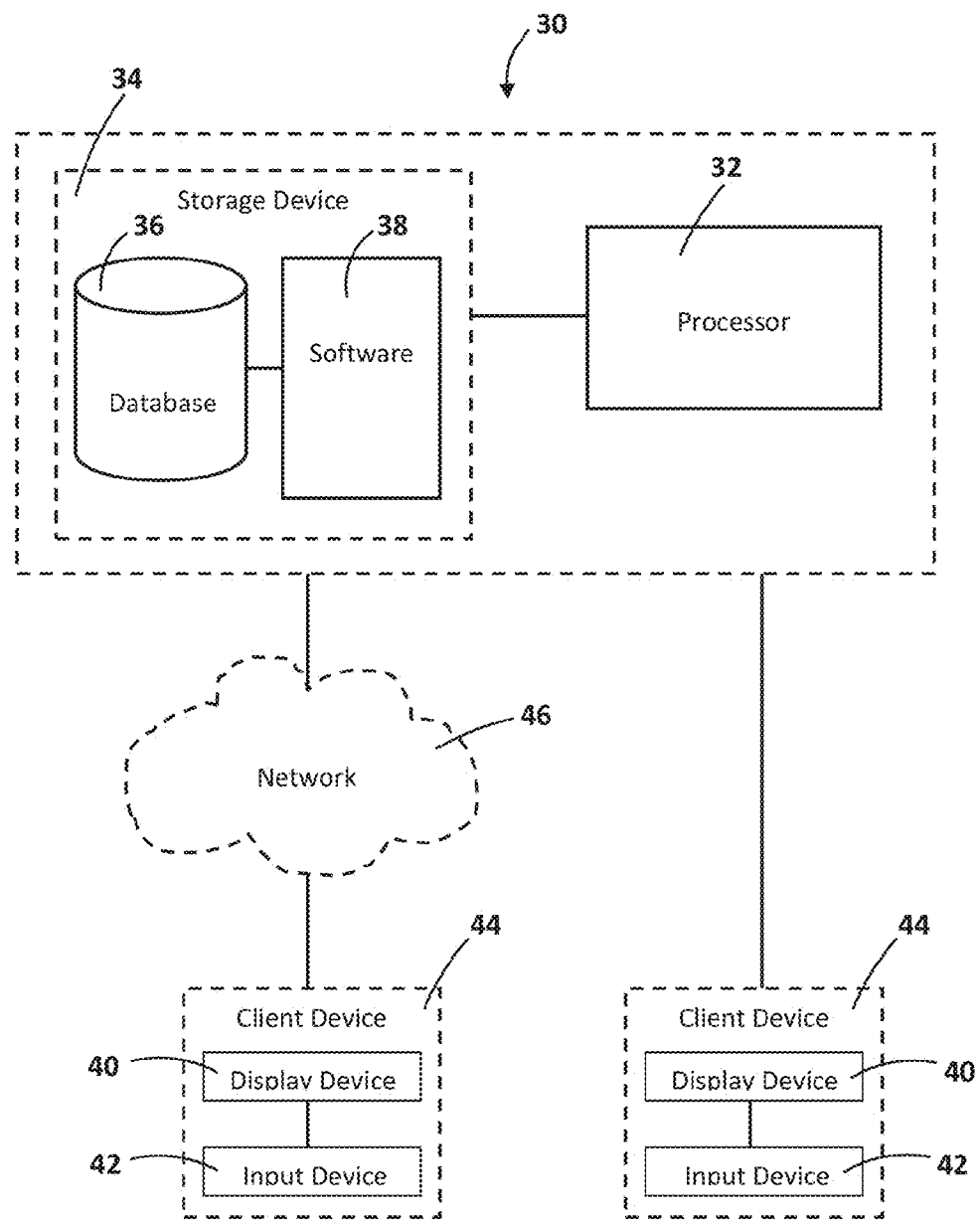
FIG. 2 illustrates a simplified sales performance management system.
Figure 3:
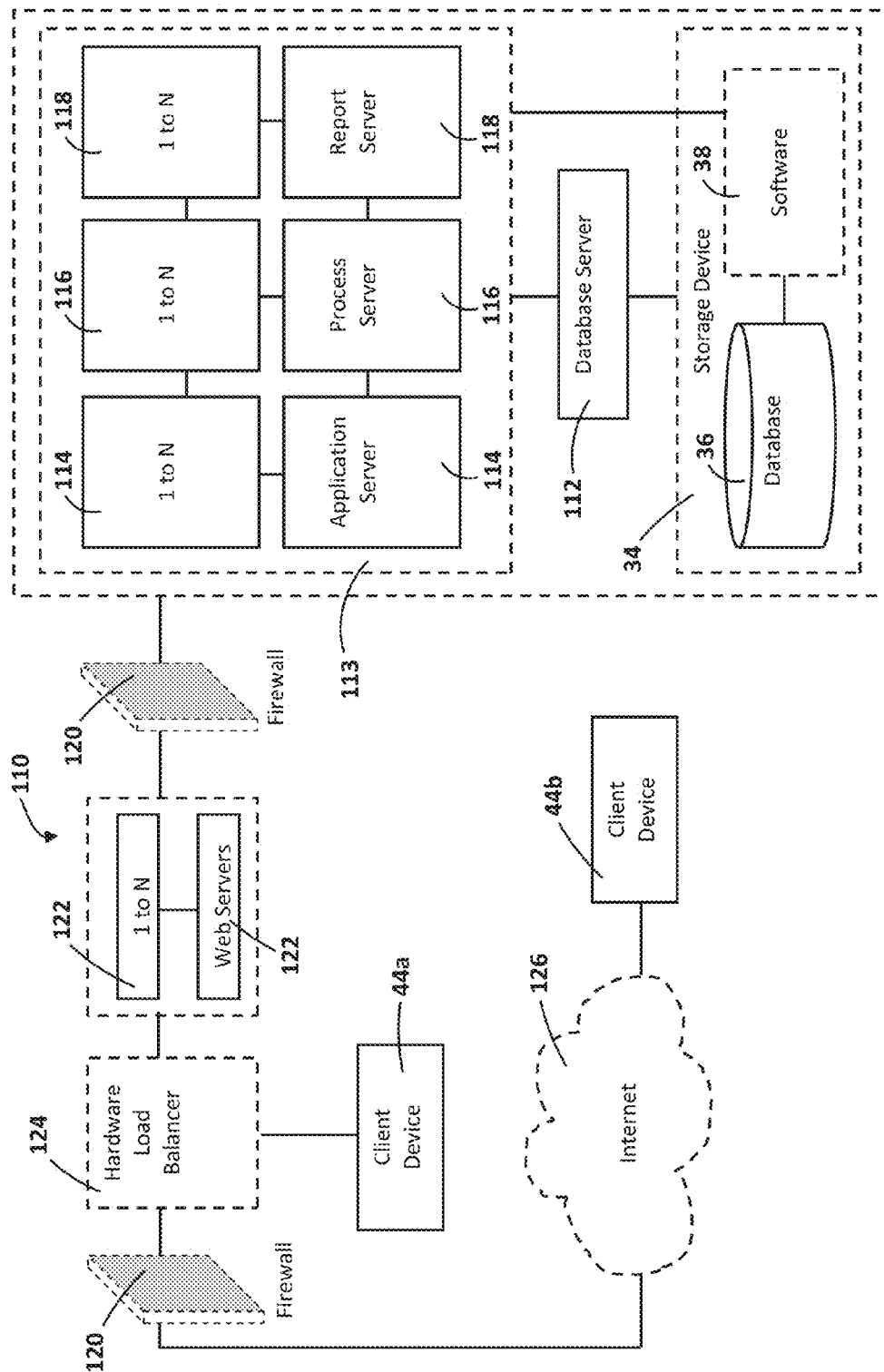
FIG. 3 illustrates a server based scalable sales performance management system.

In SPM systems and software, such as the sample systems shown in FIGS. 2 and 3, business data may be stored in data tables that each contains various data fields. As discussed above, many of the same data fields are used repeatedly in different tables to identify different, or the same, sets of data. In many cases, these repetitive data fields represent key people, places, or things for which a company maintains different types of data. In the SPM field, multiple sets of different data are often maintained in data tables for business units such as "products," "services," "customers," "employees," "partners," "positions," "geographies," etc. Each of these key people, places, and things frequently represented in SPM systems' data tables may be identified by several different data fields (i.e., columns of a data table), including a field containing data that uniquely identifies each instance of the business unit, and one or more fields containing data that are descriptive "attributes" of the business unit. When data for these key people, places, and things is displayed in data tables, the data tables should display both the unique identifier fields as well as the descriptive attribute fields, since the latter are more easily recognized and understood by users.

As discussed above, the same sets of data are often stored in the same data fields across different data tables in known SPM systems, which require extra storage space and result in inefficiencies when data values are updated. These inefficiencies are exacerbated by the fact that data values in the descriptive attribute fields for a business unit, which change more frequently than data values in its unique identifier field, are often repeated across different data tables. In addition, the data for key people, places, and things that are stored in different data tables must be associated with each other to be used in processes and calculations by the SPM system. There are also difficulties associated with controlling what data in a table can be displayed to individual users, and ensuring that data values are valid and in synch across different data tables. The present invention addresses these problems by representing key business units as "entities" using unique entity tables that can be used across different operations and modules of an SPM system.

As discussed above, a SPM or other business system utilizing the present invention may be made up of a number of interrelated business applications. Entities may be used in each one of these business applications to define what business units are involved in specific functions, and to create standardized templates driven by those business units. In other words, a business application may require certain roles or responsibilities to be fulfilled, but will allow the user to fill those roles with specific business units (i.e. entities) that make the most sense for that user's business. This gives the SPM applications a great deal of flexibility to meet each user's unique business needs, and presents the user with a very business-oriented structure to configure and use each application. For example, a workflow process management application generally utilizes data associated with a business unit that may create a workflow request, and data associated with another business unit that may take action on that request. Instead of predefining which business unit should fill those roles, the present system allows the user to select entities for each role that makes sense for the user's business and the specific workflow at hand (e.g., employee, contractor, manager, administrator, etc.). Similarly, a SCM application directed to earnings and payments generally includes at least two roles—the business unit for which earnings are calculated and the business unit for which payments are made—and the user may specify which entities should fill those roles. In an example territory management application, the user may specify an entity for the role representing a geography, and another entity for the role representing the business unit that is aligned with that geography for purposes of measuring performance. In an example crediting application, the user may specify an entity for the role representing a geography, and another entity for the role representing a "person" business unit that is assigned to that geography and gets credit for sales and other operations in that geography. These are merely some illustrative examples of how entities may be used within SPM business applications and embodiments of the present invention are not limited in these respects.

FIG. 2 illustrates an embodiment of a SPM system 30 according to the present application for representing and utilizing data related to a business unit with significant meaning in business applications and processes. Elements shown in dotted lines represent optional components and groupings within the system 30. The system 30 shown in FIG. 2 includes a processor 32, a storage device 34 in communication with the processor 32, a display device 40 in communication with the processor 32, and an input device 42 in communication with at least one of the processor 32, storage device 34, or the display device 40. The processor 32 and storage device 34 may be separate or part of the same machine. The processor 32 may further be associated with, or incorporated into, any suitable type of computing device, such as, for example and without limitation, a personal computer, a programmable logic controller, a server, or a mobile computing device. As shown in FIG. 2, the display device 40 and the input device 42 may be part of a client device 44, which is in communication with at least one of the processor 32 or the storage device 34. Optionally, the display device 40 and input device 42 may be part of the same device, such as the touch screen display 222 of the tablet computer 220 shown in FIG. 20. The client device 44 may be directly associated with the processor 32 or storage device 34, such as through a direct connection or by being part of the same machine. Alternatively, the client device 44 may communicate with the processor 32 or storage device 34 through a network 46, such as a wide area network (WAN), local area network (LAN), or the internet. For example and without limitation, the processor 32 and the storage device 34 may be part of a server system that is physically separated from the client device 44. The display device 40 may be configured to present a graphical user interface that allows an end user to interact with the present system 30, such as the graphical user interface 50 shown in FIGS. 5A-9, 11-13B, 14B, 15B, and 16-19 and described in detail below. The storage device 34 may include a database 36 and software 38, which may be stored in the same or separate storage components within the storage device 34 and may be in communication with each other. The storage device 34 may be or include a memory device, such as random access memory (RAM), read only memory (ROM), flash memory, or a cache. The storage device 34 may also be or include a hard drive, a solid-state drive (SSD), an optical medium, a diskette, a thumb drive, or any other kind of computer-readable medium or suitable device for electronic data storage.

Figure 5A:
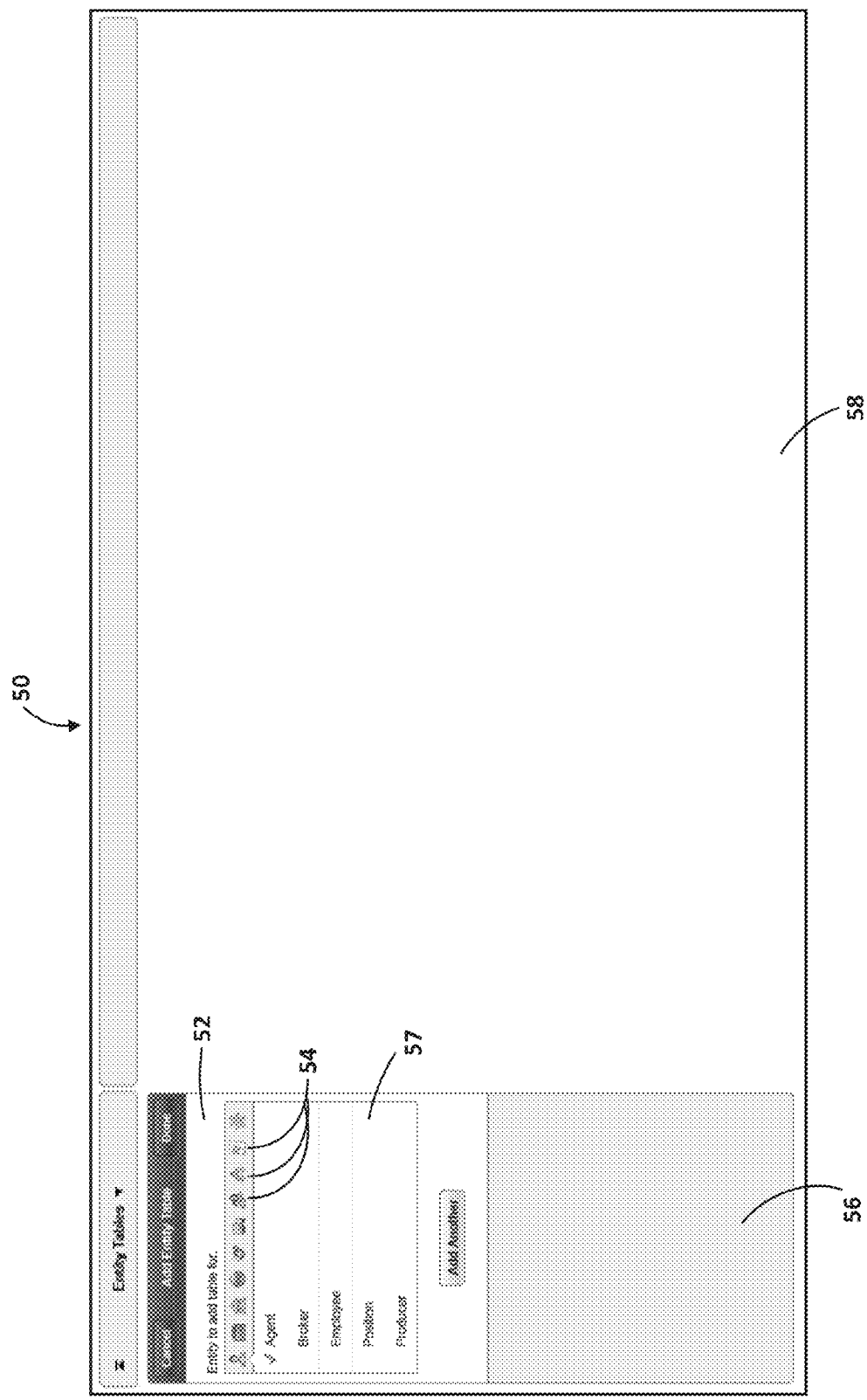
FIG. 5A is a screenshot of the graphical user interface that may be used to select an entity name.
Figure 5B:
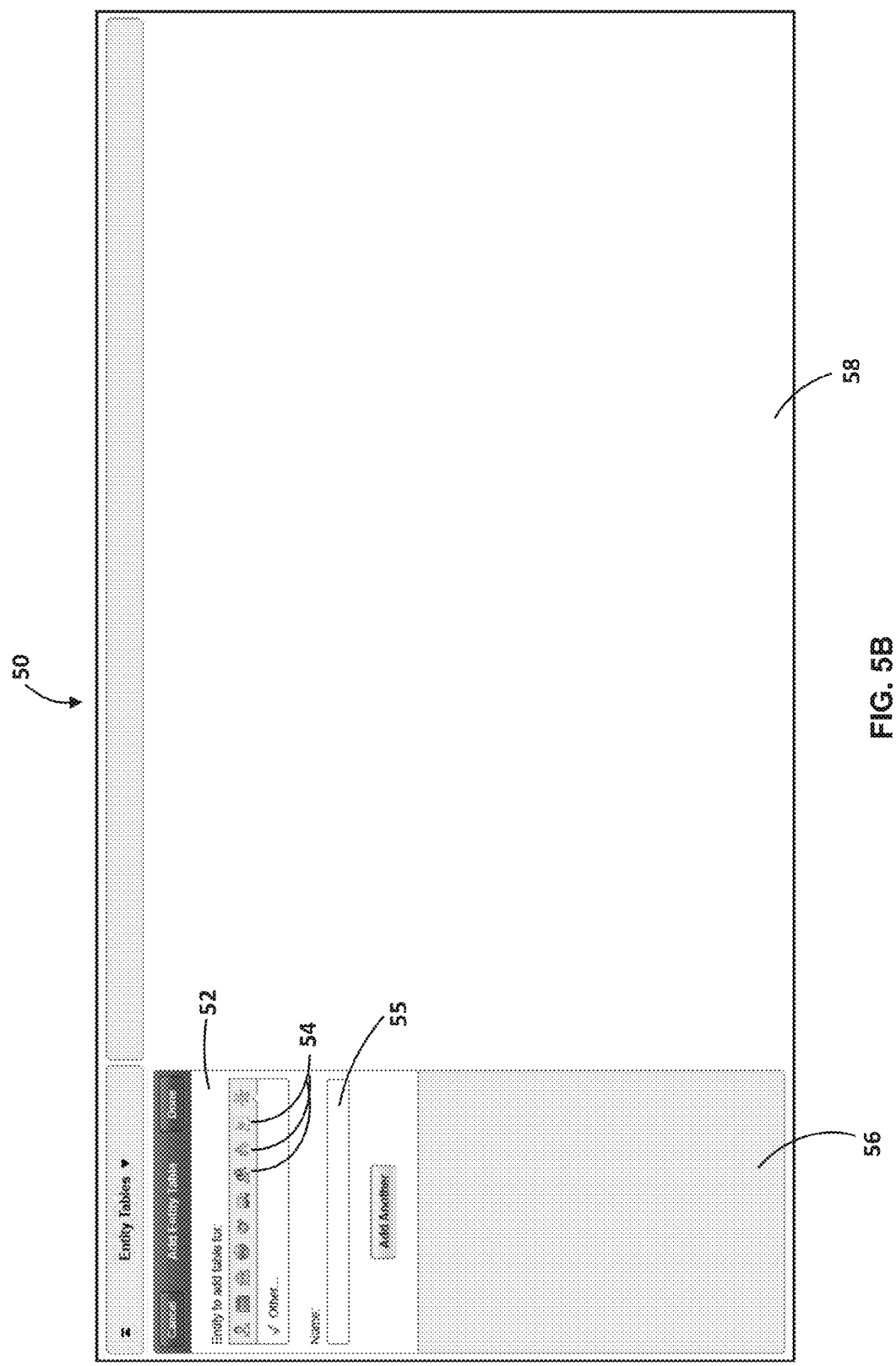
FIG. 5B is a screenshot illustrating a portion of the graphical user interface shown in FIG. 5A.

The software 38 includes a plurality of components configured to carry out steps associated with representing and utilizing data related to a business unit in the system 30, such as the method steps illustrated by the flow diagrams of FIGS. 1A and 1B, which are described in detail below. Specifically, the software 38 may include a component configured to receive a user input from the input device 42 selecting an entity name representing the business unit, and a component configured to generate an entity table that is associated with the entity name and configured to store data related to the business unit in the storage device 34. Defining a business unit as an "entity" in the system 30 with an associated entity table allows the system 30 to distinguish these business units with significant business meaning from other objects used in data tables and SPM processes, and to support their use in data tables in a different way than other objects. Allowing the user to input an entity name to represent the business unit is advantageous in that it grants the user with a large degree of flexibility in the system 30, where any business unit can be defined as an entity and used in any data table or process involving that entity. Users are free to select and define entities that make business sense for their particular organization or compensation plans. FIGS. 5A and 5B illustrate a sample graphical user interface 50 having an entity selection element 52 configured to present guidance and receive user input selecting the entity name.

As shown in FIG. 5A, the entity selection element 52 of the graphical user interface 50 may display a list of predetermined entity names from which the user can make a selection. The list of predetermined entity names may be organized by category, with each category being represented by a category icon 54 and the available entity names under each category being presented in a list 57. The list of predetermined entity names may include, for example and without limitation, the following categories and available entity names for each category shown below in Table 1.

TABLE 1

| Category | Entities |
| --- | --- |
| People | Agent |
|  | Broker |
|  | Employee |
|  | Position |
|  | Producer |
| Products | Line/Group/Class/Type |
|  | Service |
|  | SKU |
| Places | Agency |
|  | Bank |
|  | Branch |
|  | Department |
|  | Factory/Plant |
|  | Office |
|  | Store |
| Geographies | Area |
|  | Country |
|  | District |
|  | Nation |
|  | Province |
|  | Region |
|  | State |
|  | Territory |
| Customers | Account |
|  | Buying Group |
|  | Client |
|  | Consortium |
|  | Customer |
|  | Doctor |
|  | Subscriber |
| Suppliers | Distributor |
|  | Manufacturer |
|  | Reseller |
|  | Supplier |
|  | Vendor |
|  | Wholesaler |
| Team | District Team |
|  | National Account Team |
|  | Region Team |
|  | Sales Force |
| Channel | Direct |
|  | Government |
|  | Indirect |
| Transaction | Contract |
|  | Invoice |
|  | Line Item |
|  | Order |

Figure 13A:
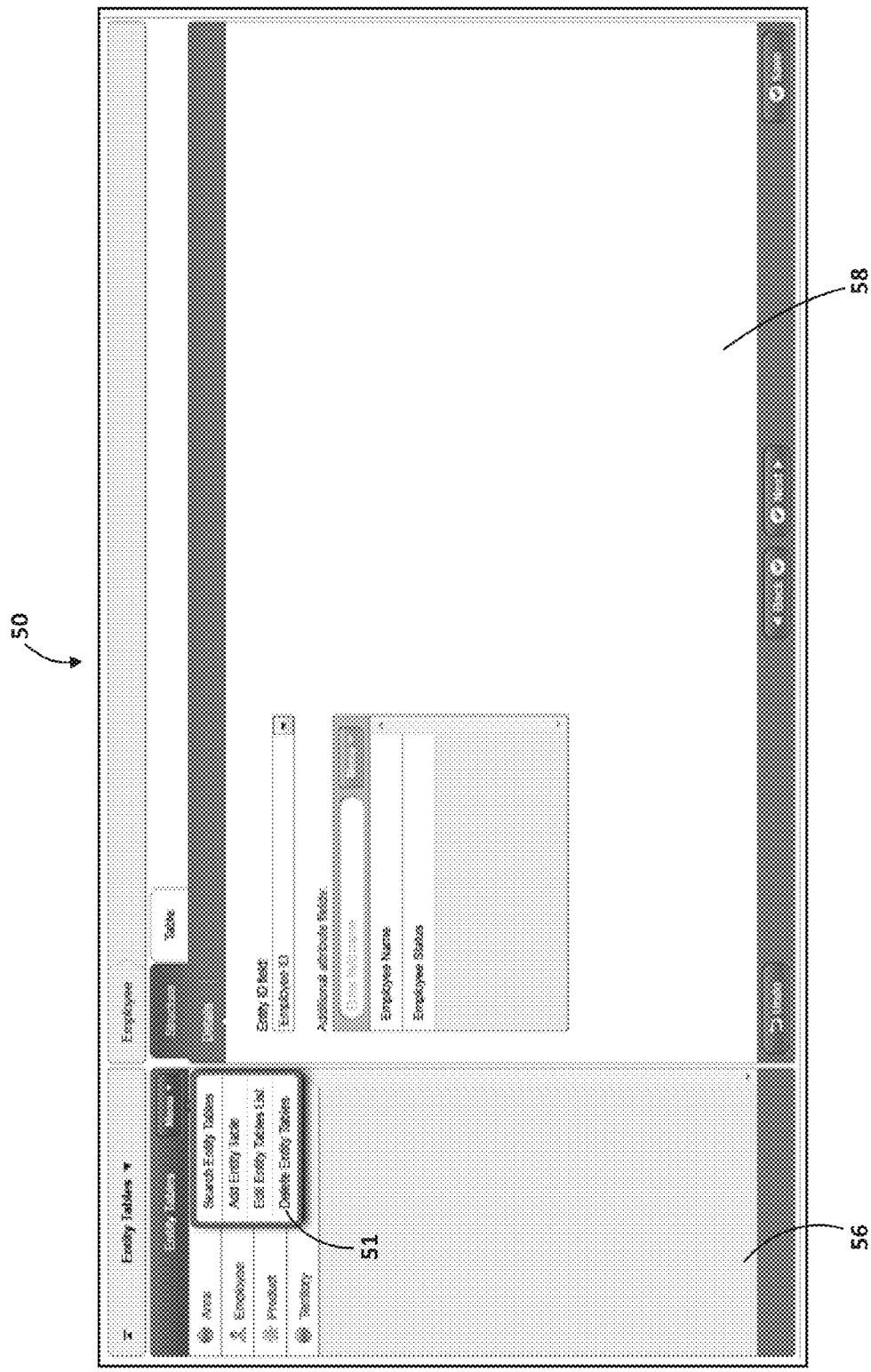
FIG. 13A is a screenshot illustrating additional components of the graphical user interface.
Figure 13B:
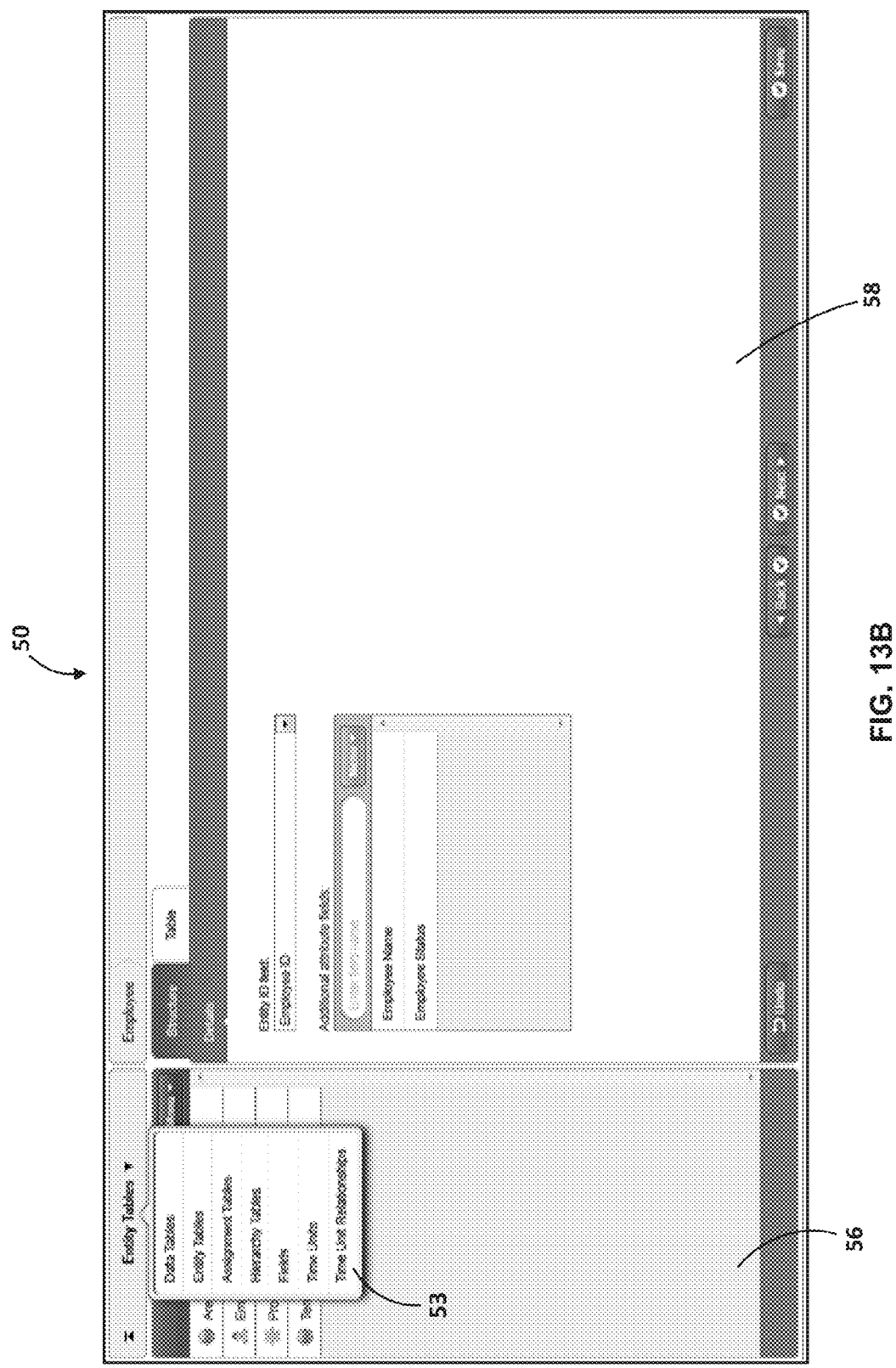
FIG. 13B is a screenshot illustrating other additional components of the graphical user interface.

As shown in FIG. 5B, the entity selection element 52 of the graphical user interface 50 may also include a custom name feature 55 that allows the user to input a custom user-specified entity name where the business unit to be represented as an entity is not among the list 57 of predetermined entity names. As shown in FIGS. 5A and 5B, the entity selection element 52 may be presented in a left hand pane 56 of the graphical user interface 50, while a right hand pane 58 of the graphical user interface 50 is used for functions that require more display space, as described below. As shown in FIGS. 13A and 13B, the graphical user interface 50 may include additional components, such as drop down menus 51, 53 in the left hand pane 56, which provide various functions and options with respect to data tables. The present system 30 may be configured such that a user can select as many entity names as desired using the entity selection element 52 of the graphical user interface 50 before having to completely define the entity and its related data fields. This allows the user to establish the complete set of entities expected to be used in the system 30, even if the details of those entities are not yet known.

FIG. 4 illustrates a sample entity table 60, which is associated with the entity name "employee" and configured to store data related to the employee business unit. The entity table 60 includes a plurality of data fields 62 (i.e., columns of the table), including an explicit entity ID field 64 and an internal entity ID field 66. At least some of the data fields 62 of the entity table 60 are what a user sees and explicitly interacts with when adding or modifying data records in the entity table 60. The explicit entity ID field 64 is configured to store explicit entity ID values 68 that each uniquely identifies an instance of the business unit being represented as an entity. Since the explicit entity ID values 68 serve as unique identifiers of the entity, no two explicit entity ID values 68 are identical. Accordingly, the name of the explicit entity ID field 64 should be selected to reflect such data values. For example, where the business unit represented as an entity is "employee," the explicit entity ID values 68 may be in the form of, for example and without limitation, social security numbers or unique employee numbers. Since no two employees can have the same social security number or the same unique employee number, these types of data values are suitable for use as explicit entity ID values 68 to unique identify and differentiate each instance of the "employee" business unit from each other. The employee entity table 60 illustrated in FIG. 4 uses employee ID as the explicit entity ID field 64, with unique four digit employee ID numbers as the explicit entity ID values 68. As another example, where the business unit represented as an entity is "product," the explicit entity ID values 68 may be in the form of unique product codes, provided that no two different types of products can be identified by the same product code. Although numeral values are used as sample explicit entity ID values 68 in the entity table 60 of FIG. 4, one of ordinary skill in the art would appreciate that the explicit entity ID values 68 may be in any other suitable format, including without limitation letters, a combination of alphanumeric characters, or special characters.

An entity table may consist solely of the explicit entity ID field 62 and the internal entity ID field 66, in which case the entity table exists to identify each instance of the business unit being represented as an entity. However, an entity table may also include additional optional data fields 62 in the form of entity attribute fields 72, as shown in the entity table 60 of FIG. 4. The entity attribute fields 72 contain entity attribute values 74 that are descriptive of, but do not uniquely identify, each instance of the entity. The type of data stored in entity attribute fields 72 should be descriptive of attributes that do not change frequently over time, but rather are key features of the entity. For example, the entity able 60 shown in FIG. 4 includes a first entity attribute field 72a for storing first entity attribute values 74a in the form of employee names, a second entity attribute field 72b for storing second entity attribute values 74b in the form of employee addresses, and a third entity attribute field 72c for storing third entity attribute values 74c in the form of employment statuses. Employee names are represented in the first entity attribute field 72a instead of the explicit entity ID field 64 because a name does not uniquely identify each employee, as two different individuals may have the same name. In contrast, predetermined employee ID numbers can be created to uniquely identify each employee without two employee ID number being identical to each other. Similarly, the second entity attribute values 74b relating to employee addresses may include two or more identical data records, since multiple employees may share the same residential address. The third entity attribute values 74c relating to employee status may also include two or more identical data records, since an organization is likely to have multiple employees with the same employment status. While an employee's name, address, and employment status are key features that are unlikely to change frequently over time, other attributes related to the employee, such as salary and position, should not be represented as entity attribute fields 72 in the entity table 60 because those attributes are more likely to change on a regular basis. As another example, where the business unit represented as an entity is "product," the associated entity table may include entity attribute fields for "product name" and "product category" (assuming that each product belongs to only one category). Each entry of the entity attribute values 74a, 74b, 74c is associated with a corresponding one of the explicit entity ID values 68 to provide information descriptive of an attribute of the instance of the entity identified by the associated explicit entity ID value 68. The entity attribute values 74a, 74b, 74c are preferably stored in the entity attribute fields 72a, 72b, 72c in the same order as their associated explicit entity ID values 68, such that each one of the first, second, and third entity attribute values 74a, 74b, 74c is in the same row of the entity table 60 as the corresponding explicit entity ID value 68 as shown in FIG. 4.

Figure 6:
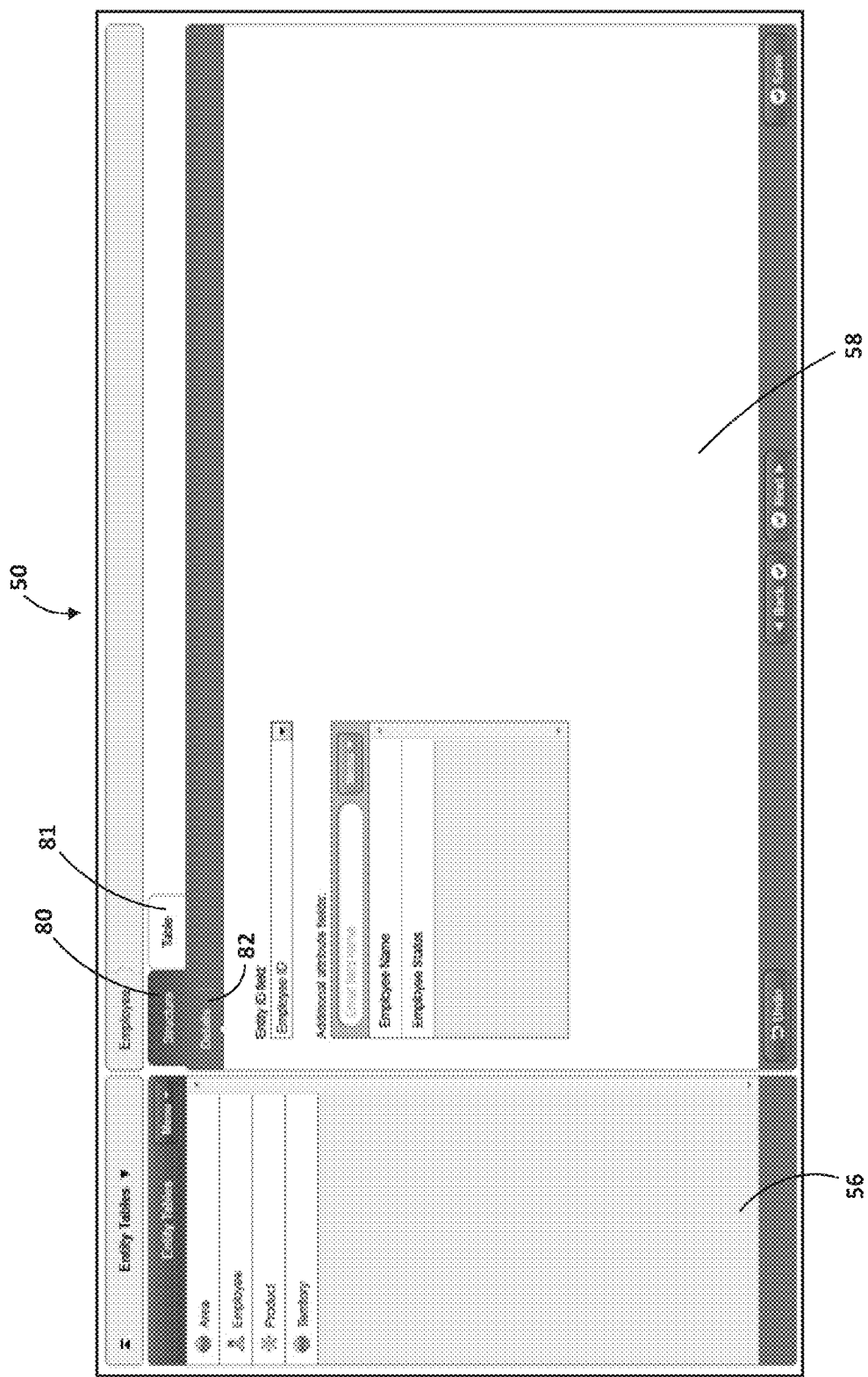
FIG. 6 is a screenshot of the graphical user interface that may be used to present guidance and receive user input for defining the entity table, including a portion related to inclusion and naming of data fields.

The graphical user interface 50 may include a component configured to provide guidance and receive user inputs when the entity table 60 associated with the business unit is generated. For example and without limitation, the graphical user interface 50 may include a structure element 80 providing guidance and options for defining the structure of the entity table 60, as shown in FIGS. 6-9. The structure element 80 may be presented in the right hand pane 58 of the graphical user interface 50, such as in the form of a tabbed page. The structure element 80 may also include a field details element 82, which may be presented in the form of a sub-tab. The field details element 82 may be configured to provide guidance, present options, and receive user input related to selection of the data fields 62 that identify the entity and make up the structure of the entity table 60. As shown in FIG. 6, the field details element 82 may include a dropdown menu that directs the user to select a single field that represents the explicit entity ID field 64. Since the explicit entity ID values 68 are used in the system 30 to uniquely identify each instance of the entity, only a single explicit entity ID field 64 is permitted in the entity table 60. The explicit entity ID field 64 is used as the single key field in the entity table 60. To further enforce the requirement that the entity table 60 can contain only one explicit entity ID value 68 for each instance of the entity, the graphical user interface 50 may be configured to prohibit selection of date or time period fields to identify when an explicit entity ID value 68 is valid. In other words, the user cannot select a time period during which an instance of the entity is identified by one explicit entity ID value, and then select a different time period during which the same instance of the entity is identified by another explicit entity ID value.

The field details element 82 of the graphical user interface 50 may also include options for selecting additional entity attribute fields 72 to be included in the entity table 60. As discussed above, entity attribute fields 72 are not required components of the entity table 60, but may be included to store data values that are descriptive, but do not uniquely identify, each instance of the entity. As shown in FIG. 6, the field details element 82 may include a menu that permits the user to select one or more entity attribute fields 72 by manually inputting a entity attribute field name, or by selecting a name from a list of predetermined entity attribute field names.

The present software 38 also includes a component configured to receive a data input of explicit entity ID values 68 and store the explicit entity ID values 68 in the explicit entity ID field 64 of the entity table 60. The data input of explicit entity ID values 68 may be carried out by the user or by the system 30 through an automated process. For example and without limitation, the data input may be achieved by manually entering each explicit entity ID value 68 in the explicit entity ID field 64 of the entity table 60, by importing explicit entity ID values 68 from a data file, or by an automated data load process. Where the entity table 60 also includes one or more entity attribute fields 72, the corresponding entity attribute values 74 may be inputted to the system 30 in similar ways. The graphical user interface 50 may be configured to provide guidance and receive user direction during the data input process.

Figure 7:
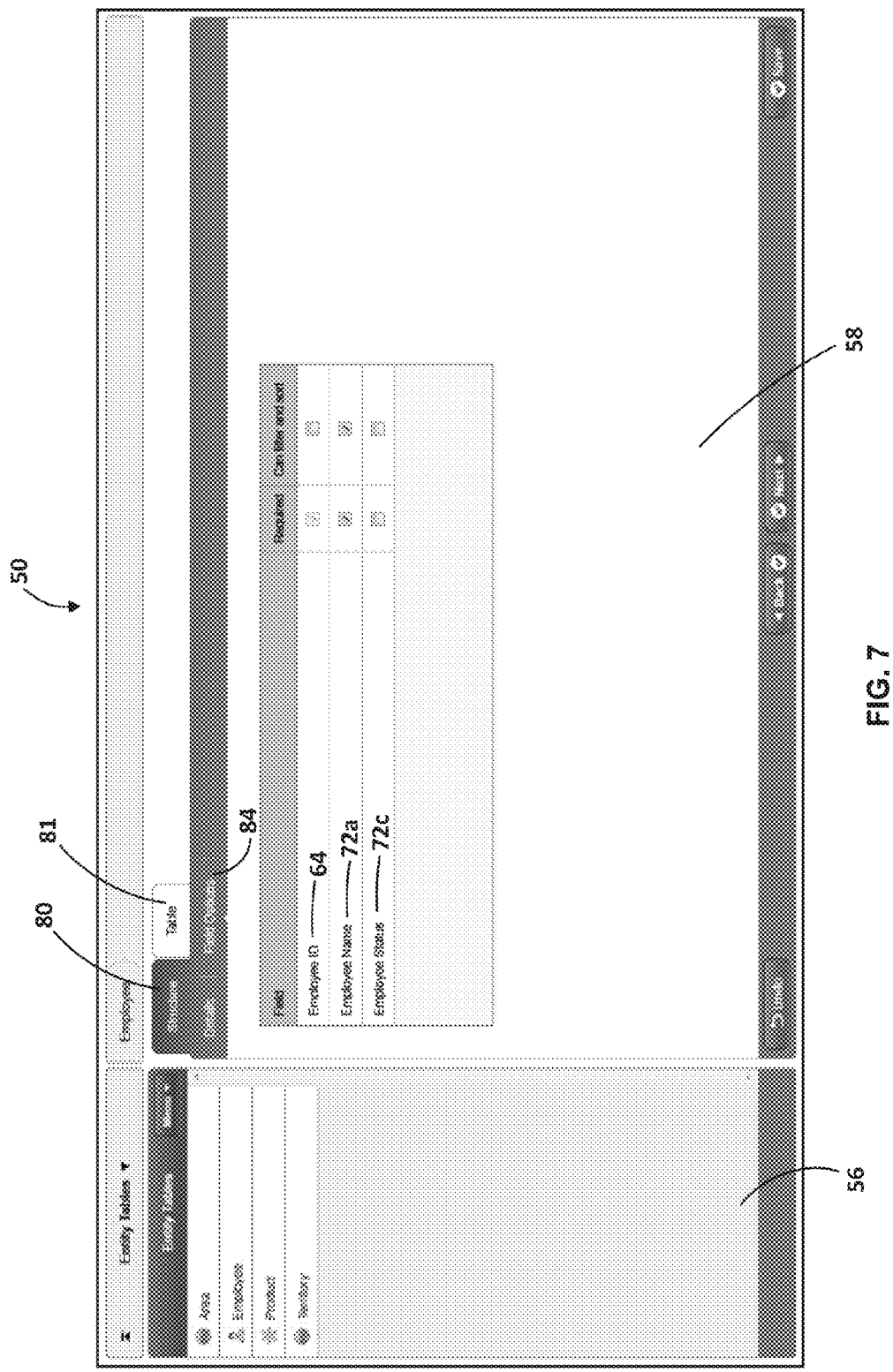
FIG. 7 is a screenshot illustrating a portion of the graphical user interface shown in FIG. 6 related to behavior of data fields.

As shown in FIG. 7, the structure element 80 may include a field options element 84, which may be presented in the form of a sub-tab in the right hand pane 58 of the graphical user interface 50. The field options element 84 may be configured to provide guidance, present options, and receive user input related to behavior of the data fields 62 within the data table 60. For example and without limitation, the field options element 84 shown in FIG. 7 may present an interface and receive user input regarding which data fields 62 are required in the entity table 60 (i.e., cannot be left empty when entering data records into the entity table 60), and which data fields 62 are available for sorting and filtering features. In the example field options element 84 of FIG. 7, the explicit entity ID field 64 "Employee ID" is marked "required" by default because the entity table 60 must include at least one explicit entity ID value 68 to identify an instance of the entity. Since the entity attribute field 72 "Employee Status" is not marked as "required," the entity table 60 can be created and utilized by the system 30 even if no entity attribute values 74 related to employee status are entered.

The present software 38 also includes a component configured to generate a unique internal entity ID value 70 for each one of the explicit entity ID values 68, and to associate each internal entity ID value 70 with a corresponding one of the explicit entity ID values 68. The internal entity ID values 70 are used by the system 30 to identify each explicit entity ID value 68, and in turn, each instance of the business unit being represented as an entity. Therefore, the internal entity ID values 70 must be unique within each entity table 60, similarly to the explicit entity ID values 68. This is necessary because the internal entity ID values 70 are used by the system 30 to associate data values from entity tables with other data tables that utilize entities, as described in further detail below. Unlike the explicit entity ID field 64 and any entity attribute fields 72, which are selected by the user, for example using the field details element 82 of the graphical user interface 50, the internal entity ID field 66 of the entity table 60 is generated by the system 30. In the sample employee entity table 60 shown in FIG. 4, the internal entity ID field 66 contains internal entity ID values 70 in the form of unique three digit numbers. One of ordinary skill in the art would appreciate that the internal entity ID values 70 may also be in other suitable formats, including without limitation letters, a combination of alphanumeric characters, or special characters. The software 38 further includes a component configured to store the internal entity ID values 70 in the internal entity ID field 66 of the entity table 60, preferably in the same order as their associated explicit entity ID values 68 such that each internal entity ID value 70 is in the same row of the entity table 60 as the corresponding explicit entity ID value 68 as shown in FIG. 4.

In order for an entity's data values to be utilized by one or more other data tables in the present system 30, the software 38 includes a component configured to associate the entity table 60 with a data table in the system 30 that is separate from the entity table 60. The data table may be stored in the same storage device 34 as the entity table 60, in a separate storage device within the system 30, or in a different storage device that is separate from but accessible by the system 30. The data table may be any table that utilizes an entity, including for display or calculation purposes. The data table may also be used to define the relationships between multiple entities, and may be in the form of "assignment" or "hierarchy" tables, which are further discussed in detail below and shown in FIGS. 17 and 19.

The data table may be any data table that utilizes data values associated with an entity, and may allow the user to specify that an entity will be used therein when the data table is being defined. FIGS. 10A and 10B illustrate a sample data table 90 that utilizes the "employee" entity table 60 of FIG. 4 in accordance with the present application to associate instances of the employee entity with compensation data. FIG. 10A illustrates how records in the data table 90 are displayed to the user, while FIG. 10B illustrates the data values that are actually stored in the data table 90. It should be understood that the data fields of the data table 90 that are displayed to the user may be different from the data fields of the data table 90 that actually store data values. The entity table 60 is associated with the data table 90 that utilizes the entity such that at least one of the explicit entity ID values 68 is displayed in an ID display field 92 of the data table 90 via the display device 40, as shown in FIG. 10A, but is not stored in the data table 90. Meanwhile, the corresponding internal entity ID value 70 associated with the at least one explicit entity ID value 68 is stored in an ID storage field 93 of the data table 90, but is not displayed via the display device 40, as shown in FIG. 10B. In this manner, when an entity's data values are used in a separate data table 90, from the user's point of view the data field used to identify the entity in the data table 90 is the explicit entity ID field 64, which contains the explicit entity ID values 68 that uniquely identifies each instance of the entity, because those are the values that are displayed to the user via the display device 40. The explicit entity ID values 68 of the entity table 60 are displayed in the ID display field 92 of the data table 90, and appear as if they are stored in the data table 90. However, that is not the case, as the system 30 does not actually store the explicit entity ID values 68 in the data table 90, but instead stores the internal entity ID values 70 associated with those explicit entity ID values 68 in the ID storage field 93 of the data table 90. In other words, the data values the user sees and interacts with in the ID display field 92 of the data table 90 are not the data values that are actually stored in the data table 90. Instead, the system 30 reads the internal entity ID values 70 stored in the ID storage field 93 of the data table 90, and retrieves the corresponding explicit entity ID values 68 to be displayed in the ID display field 92 of the data table 90. The data table 90 also includes first and second table data fields 96*a*, 96*b*, which contain and display first and second table data values 98*a*, 98*b* regarding each employee's annual salary and bonus eligibility, respectively. As discussed above, the types of data values associated with an entity and stored in the entity table 60 are unlikely to change frequently over time, and cannot be identified by effective dates or time periods, as doing so would imply that more than one record per instance of the entity can exist over time. In contrast, the first and second table data values 98a, 98b represent information that is likely to change frequently over time, and therefore is better suited to being stored in the data table 90 and may be associated with effective dates or time periods.

By displaying and allowing the user to interact with the explicit entity ID values 68 of an entity in the ID display field 92 of the data table 90, while only storing the internal entity ID values 70 in the ID storage field 93, the present system 30 achieves significant benefits. First, this technical approach allows the explicit entity ID values 68 stored in the entity table 60 to be changed at any time without having to make the corresponding change in each data table that utilizes those explicit entity ID values 68, since each data table only references the associated internal entity ID values 70 (which do not change) and automatically displays those updated explicit entity ID values 68 to the user when they view the data tables. Because the explicit entity ID values 68 are not actually stored in the data table 90, any updates to the explicit entity ID values 68 only has to be made once in the entity table 60, and not in every data table that utilizes those entity values. This ensures that entity values are consistent (i.e., in synch) across all data tables that utilizes the entity, while reducing the need for extra storage space and administrative burden when entity values are updated. In fact, because changes to entity values can only be made through the entity table 60, the present system 30 reduces opportunities for error and simplifies auditing of changes to entity values. In contrast, the first and second table data values 98a, 98b that are displayed in the first and second table data fields 96a, 96b are both displayed and stored in the data table 90, and any changes to those table data values 98a, 98b must be made within the data table 90 itself.

When an entity is used in a data table, the system 30 may receive a user input via the input device 42 selecting at least one explicit entity ID value to identify at least one instance of the entity. As discussed above, the user selected explicit entity ID value and any associated entity attribute values 74 are displayed in the data table 90, but only the corresponding internal entity ID values 70 are actually stored in the data table 90. The user input may be, for example and without limitation, a manual data entry, a data load process, or any other suitable data input method. The graphical user interface 50 may include a component, such as the "save" button shown in FIGS. 5-9, that allows the user to confirm that the user input is complete and that the user selected data values should be displayed in the data table 90. The software 38 of the system 30 may include a component configured to validate that the user selected explicit entity ID value to be displayed in the ID display field 92 of the data table 90 is a valid explicit entity ID value stored in the explicit entity ID field 64 of the entity table 60. In other words, the user selected explicit entity ID value must match one of the explicit entity ID values 68 in the entity table 60 for that entity. By requiring the user selected explicit entity ID value entered in the data table 90 to be a valid data value that already exists in the associated entity table 60, the system 30 ensures that only valid entity data values are being used across different data tables, and that an internal entity ID value 70 exists for the user selected explicit entity ID value and can be stored in the data table 90. Where the user selected explicit entity ID value is valid, the system 30 permits the user selected explicit entity ID value to be displayed in the ID display field 92 of the data table 90, and stores the corresponding internal entity ID value 70 associated with the user selected explicit entity ID value in the ID storage field 93. However, where the user selected explicit entity ID value is not valid, the graphical user interface 50 may be configured to present an error message to the user via the display device 40, and nothing is displayed or stored in the data table 90 because the user selected explicit entity ID value does not exist in the entity table 60.

Figure 11:
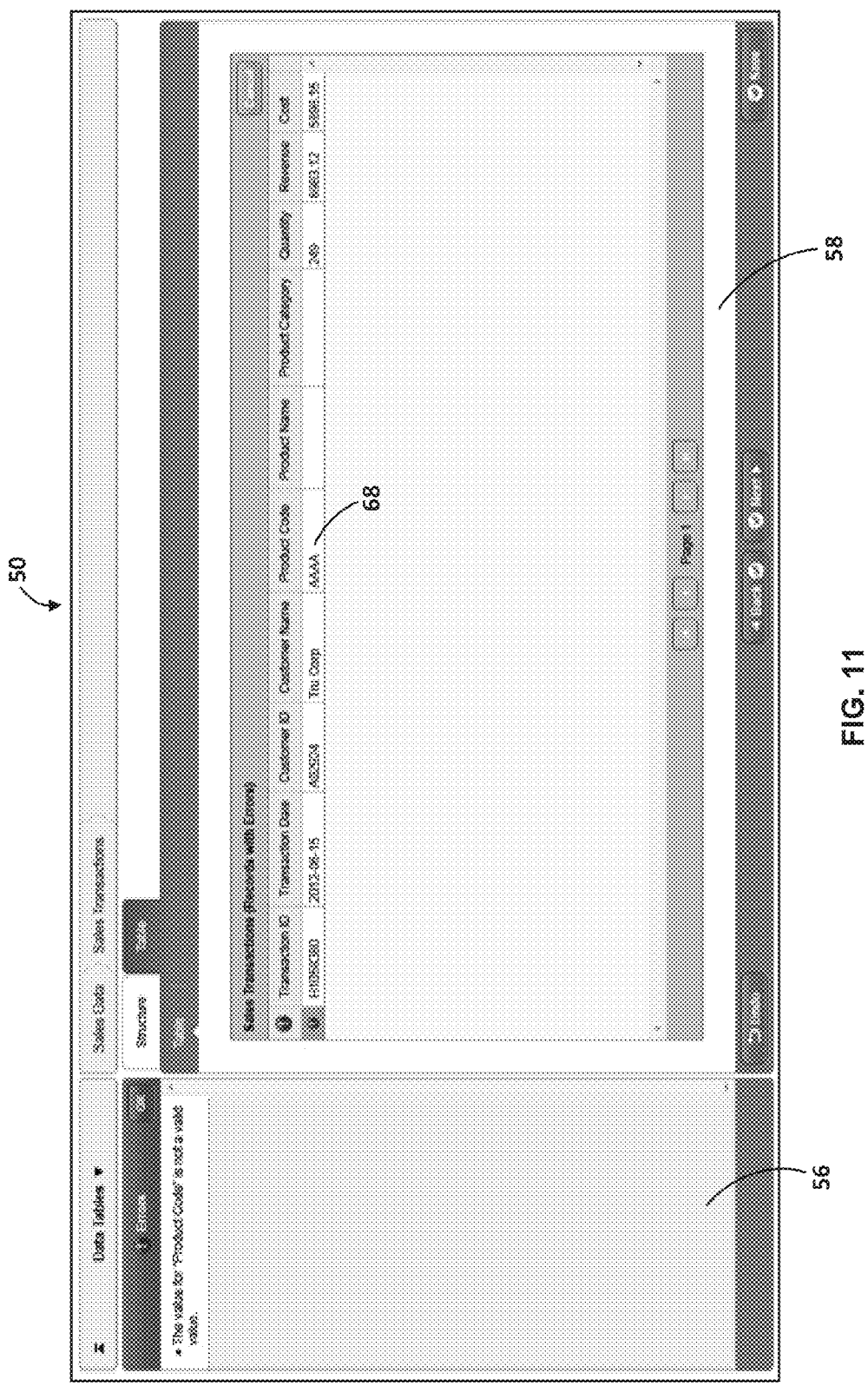
FIG. 11 is a screenshot illustrating an error message that may be generated by the graphical user interface during the validation step.

FIG. 11 illustrates a sample error message generated by the graphical user interface 50 when an invalid explicit entity ID value in the form of a product code "AAAA" is entered in the ID display field of a data table that utilizes the "product" entity. For example and without limitation, the error message may include an explanation of the error in the left hand pane 56 of the graphical user interface 50, and a table view of the record containing the error in the right hand pane 58 of the graphical user interface 50, as shown in FIG. 11. This validation feature helps to simplify administration and maintenance of data tables within the system 30, and ensures that only valid entity data values are being used in data tables. This is advantageous because when entities are used in data tables, those entities represent important business units for which data accuracy is especially important.

In a data table that utilizes an entity, such as the sample data table 90 illustrated in FIGS. 10A and 10B, it is often desirable to display the explicit entity ID values 68 as well as any additional entity attribute values 74 that exist for the entity. Although values stored in the explicit entity ID field 64 of the entity table 60 are always displayed in the ID display field 92 of the data table 90 that utilizes the entity, in many cases those explicit entity ID values 68 are not data that typical users can easily recognize and use to identify each instance of the entity. For example, while "Employee ID" is the explicit entity ID field 64 of the "employee" entity table 60, most users would not recognize every employee in a company by their employee ID numbers. Accordingly, one or more entity attribute fields 72 may be selected to be displayed in the data table 90 along with the explicit entity ID field 64. The software 38 may include a component configured to receive and process a user input selecting those entity attribute fields 72 and associated entity attribute values 74 to be displayed in the data table 90.

As discussed above, the data table 90 shown in FIGS. 10A and 10B utilizes the "employee" entity associated with the entity table 60 of FIG. 4. FIG. 10A illustrates how the data table 90 is displayed to the user, while FIG. 10B illustrates the data values that are actually stored in the data table 90. The data table 90 displays data values associated with the employee entity along with compensation data for each instance of the entity (i.e., each employee), including first table data values 98a regarding annual salary and second table data values 98b regarding bonus eligibility. Since "Employee ID" is selected as the explicit entity ID field 64 in entity table 60, explicit entity ID values 68 in the form of four digit unique employee ID numbers are displayed in the ID display field 92 of the data table, as shown in FIG. 10A. However, since it may be difficult for a user to recognize which employee is represented by which employee ID number, the first entity attribute field 72a "Employee Name" of the entity table 60 is selected to be displayed in the data table 90. Accordingly, each of the first entity attribute values 74a is associated with a corresponding one of the explicit entity ID values 68, and is displayed in the attribute display field 94 of the data table 90 in the same row as the corresponding explicit entity ID value 68.

As shown in FIG. 10B, although the first entity attribute values 74a are displayed in the attribute display field 94, they are not actually stored in the data table 90. Instead, the only entity values stored in the data table 90 are the internal entity ID values 70 that correspond to the explicit entity ID values 68 displayed in the ID display field 92. The data table 90 references those internal entity ID values 70 to retrieve the explicit entity ID values 68 to be displayed, and because the first entity attribute field 72a is specified by the user or system 30 as a "display" field, the first entity attribute values 74a associated with the displayed explicit entity ID values 68 are also retrieved and displayed in the data table 90. By only storing the internal entity ID values 70 in the data table 90, even where the data table 90 includes one or more attribute display fields 94 that display entity attribute values 74, the present system 30 reduces the need for extra storage space, since the displayed explicit entity ID values 68 and entity attribute values 74 are not stored in every data table that utilizes those entity values. Furthermore, any changes to the first entity attribute values 74a displayed in the attribute display field 94 of the data table 90 may only be made in the entity table 60, and are then automatically reflected in the data table 90 and any other data table that utilizes the employee entity. As discussed above, this ensures that entity values, especially entity attribute values 74 that are more prone to change than explicit entity ID values 68, are consistent and in synch across all data tables of the system 30, without the need for extensive administration and maintenance efforts.

Figure 8:
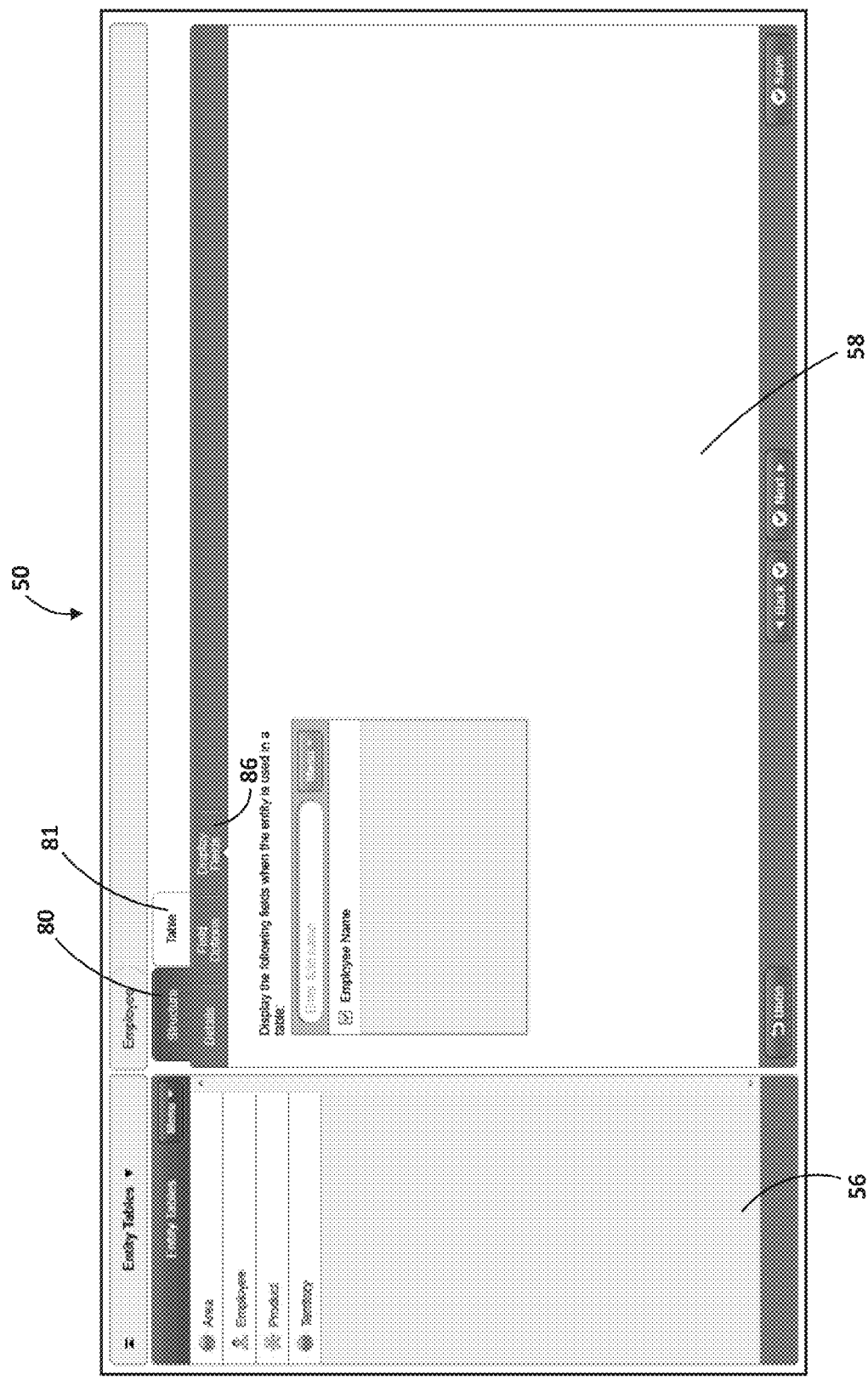
FIG. 8 is a screenshot illustrating a portion of the graphical user interface shown in FIG. 6 related to display of data fields.

The structure element 80 of the graphical user interface 50 may further include a display fields element 86, which may be presented in the form of a sub-tab in the right hand pane 58, as shown in FIG. 8. The display fields element 86 may be configured to provide guidance, present options, and receive user input related to which data fields 62 of the entity table 60 are displayed in the data table 90. For example and without limitation, the display fields elements 86 may present a menu and receive user input regarding which entity attribute fields 72 are displayed in the data table 90. In the example display fields element 86 of FIG. 8, the first entity attribute field 72a "Employee Name" is selected as a display field, and thus the first entity attribute values 74a containing each employee's name are displayed by the system 30 in the attribute display field 94 of the data table 90 shown in FIG. 10A. Since the second and third entity attribute fields 72b, 72c for "Employee Address" and "Employee Status" are not specified as display fields in the display fields element 86, those entity attribute fields 72b, 72c and the associated entity attribute values 74b, 74c are not displayed in the data table 90 shown in FIG. 10A. The display fields element 86 may be configured to present a list of available entity attribute fields 72 that may be displayed in the data table 90, the list only containing names of entity attribute fields 72 that have already been created for the entity table 60 in question. Preferably, the display fields elements 86 of the graphical user interface 50 is the only place where the user can select which data fields 62 of the entity table 60 are displayed in the associated data table 90. If the user later decides that more or less data fields 62 should be displayed in the data table 90, the user may return to the display fields element 86 to make the appropriate changes. However, the fact that a data field 62 of the entity table 60 is specified as a display field, and thus capable of being displayed in the data table 90, does not mean that the user must always view that data field 62 when viewing the data table 90. Instead, when the user is viewing the data table 90 containing one or more attribute display fields 94, the user may choose to hide certain attribute display fields 94 from being displayed using functionality associated with the data table 90.

Figure 9:
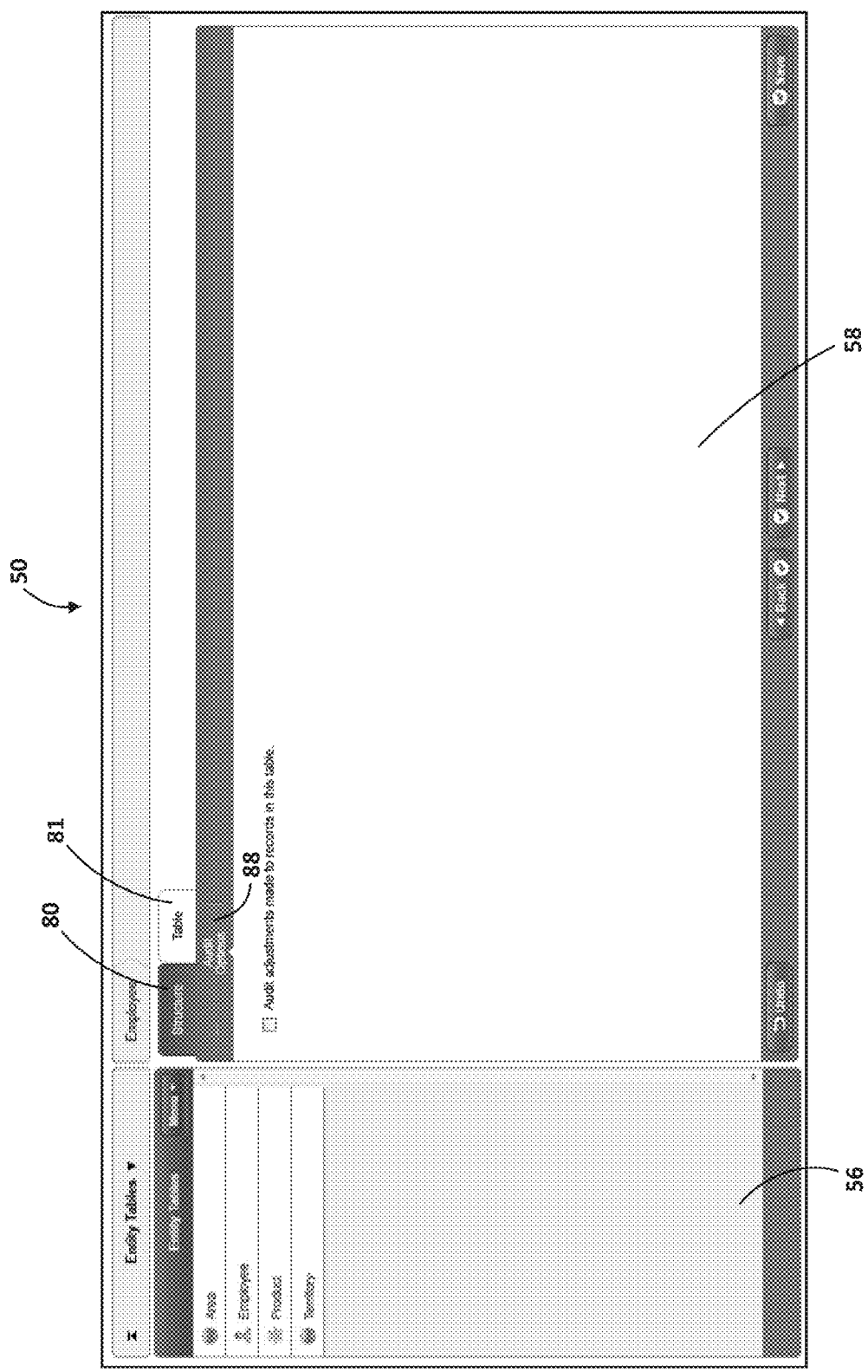
FIG. 9 is a screenshot illustrating a portion of the graphical user interface shown in FIG. 6 related to audit options.

As shown in FIG. 9, the structure element 80 of the graphical user interface 50 may further include an audit options element 88, which may be presented in the form of a sub-tab in the right hand pane 58. The audit options element 88 may be configured to provide guidance, present options, and receive user input related to whether adjustments made to records in the entity table 60 should be audited by the system 30. In the example audit options element 88 shown in FIG. 9, the interface can be a simple checkbox that allows the user to select whether changes to records in the entity table 60 should be audited. If the user selects the audit option for the entity table, the system 30 may, for example and without limitation, create an audit log that tracks each change to any data value of the entity table 60, including creations, deletions, and adjustments to data values, along with information regarding which user made the change and at what time. Such an audit log may be important for legal compliance and best business practices purposes, especially because entity data and data tables that utilize entity data often include financially sensitive information related to key business units, and certain government regulations may require such records to be kept during the normal course of business.

After the entity table 60 is set up or modified using the various elements within the structure element 80 of the graphical user interface 50, the user may use a confirmation component, such as the "save" button shown in FIGS. 5-9, to confirm that the entity table 60 is ready to be created or updated. The graphical user interface 50 may further include a table element 81 that displays a representation of the entity table 60 to the user including columns for each of the data fields 62 and the data values stored in those data fields 62, provides the user with options to add or edit data records, and allows the user to define custom table "views" using various sorting and filtering options. The internal entity ID field 66 and associated internal entity ID values 70 are generally not displayed to the user through the table element 81 of the graphical user interface 50. The table element 81 may be presented in the right hand pane 58 of the graphical user interface 50, such as in the form of a tabbed page as shown in FIGS. 5-9. The table element 81 may be used for entity tables 60 as well as other data tables 90 within the system, and will be shown and described in more detail below with respect to assignment and hierarchy tables.

Figure 12:
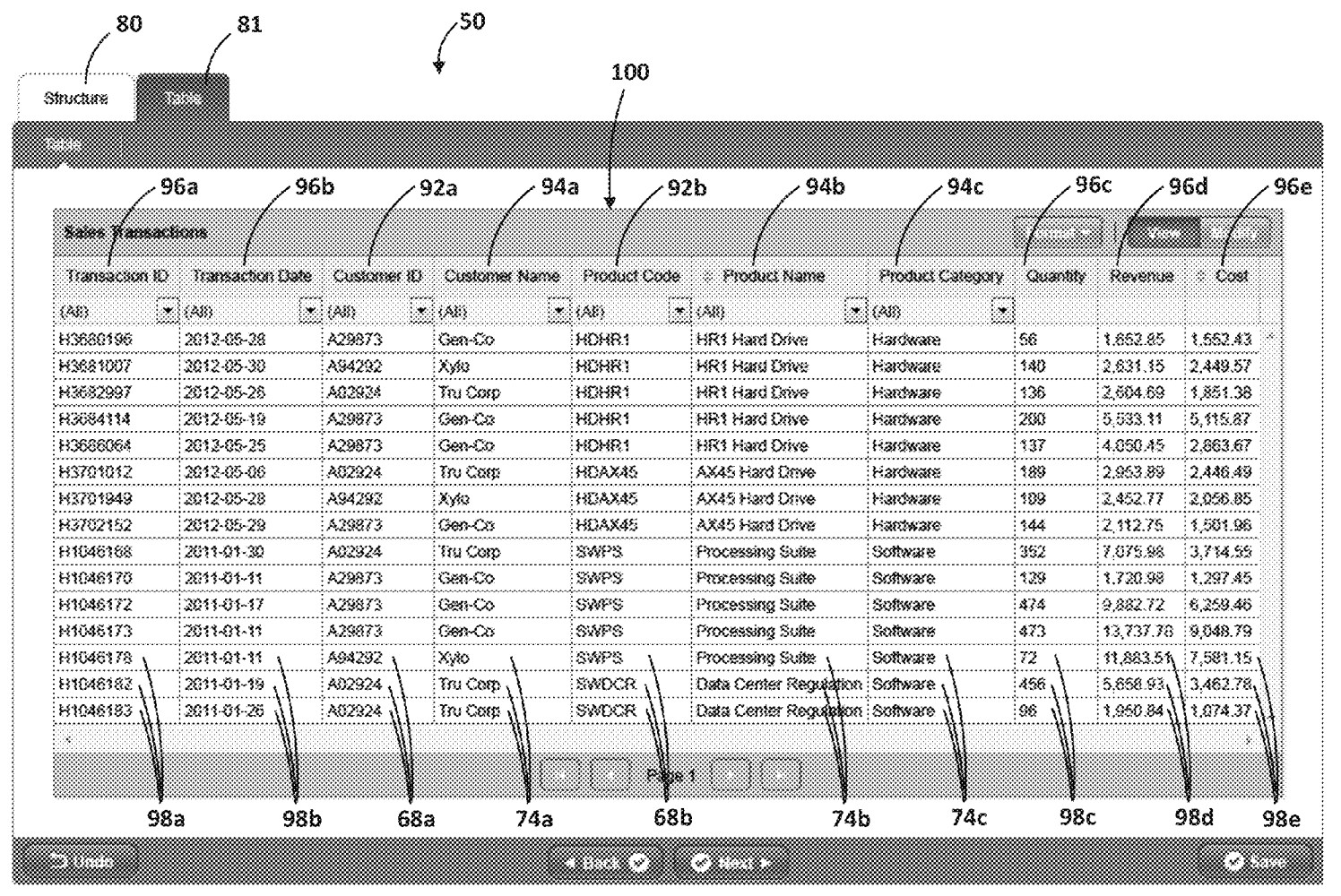

Although the data table 90 shown in FIGS. 10A and 10B and described above only utilizes one entity, the "Employee" entity associated with the entity table 60 of FIG. 4, one of ordinary skill in the art would appreciate that a data table may utilize multiple entities along with table data values 98 that are not stored in any entity tables. FIG. 12 illustrates an example data table 100 that utilizes two entities—the "Customer" entity and the "Product" entity, as the data table 100 is displayed to the user. The data table 100 is presented in the table element 81 of the graphical user interface 50, and includes many of the same data fields and elements previously discussed with respect to the entity table 60 and data table 90. Therefore, the same reference numerals are used to identify the same elements described above with respect to FIGS. 4, 10A, and 10B. In data table 100, the customer entity is represented by the explicit entity ID field "Customer ID" and the entity attribute field "Customer Name." The product entity is represented by the explicit entity ID field "Product Code" and the entity attribute fields "Product Name" and "Product Category." As shown in FIG. 12, the customer ID explicit entity ID values 68a of the customer entity are displayed in a first ID display field 92a, and the customer name entity attribute values 74a are displayed in a first attribute display field 94a. The product code explicit entity ID values 68*b* of the product entity are displayed in a second ID display field 92*b*, while the product name and product category entity attribute values 74*b*, 74*c* are displayed in a second attribute display field 94*b* and a third attribute display field 94*c*, respectively. The data table 100 further includes a plurality of table data fields 96*a*-96*e*, which contain various data values related to sales transactions 98*a*-98*e*. By utilizing the customer and product entities, the data table 100 is able to display sales transaction data in the context of the customer to whom the sale was made and what products were sold, without having to store data values related to those entities in the data table 100. In addition, if a customer changes its corporate name in the future, or if product names or categories are updated, these changes will be automatically reflected in the data table 100, as the only entity values that are actually stored in the data table 100 are the internal entity ID values associated with each instance of the customer and product entities, which are not displayed to the user.

The system 30 may also be configured to provide safeguards against accidentally deleting an instance of the entity from the entity table 60, such as by deleting an entire row containing an entity instance's explicit entity ID value 68, internal entity ID value 70, and any associated entity attribute values 74. This is because any data tables in the system 30 that utilizes that instance of the entity stores the associated internal entity ID value 70, and deleting that instance from the entity table 60 will cause the data table's query to fail when attempting to display entity data values. For example and without limitation, the system 30 may require a user to confirm the desired action before deleting any records from the entity table 60, such as through a confirmation message or pop-up window. The software 38 may include a component configured to delete an instance of the entity from the entity table 60 without interfering with operation of data tables 90 that utilize that instance of the entity. Such a component may identify all data tables in the system 30 that contains entity values associated with the instance of the entity to be deleted from the entity table 60, then upon the user's confirmation that the instance of the entity should be deleted, automatically delete any records associated with that instance of the entity from each one of those data tables. This ensures that the data tables do not encounter an error when they later try to query entity values associated with an instance of the entity that no longer exists in the entity table.

In a SPM system, such as the system 30 described in detail above, there are numerous circumstances under which it is useful to determine the relationship among two or more entities. There are two fundamental types of entity relationships—assignments and hierarchies. An assignment relationship is one in which two different entities are directly associated with each other. A hierarchical relationship may be established among different instances in various levels of the same entity, or among different entities that are at different levels of a hierarchy. For example, a hierarchy may be established within the "employee" entity to represent a multi-level reporting relationship between different employees. A hierarchy may also be established between multiple geographic entities, such as the "area," "region," "district," and "territory" entities. One of the main differences between assignment and hierarchical relationships is that an assignment represents a "flat" relationship, whereas a hierarchy represents a multi-level relationship where instances of the same entity or different entities are placed in different levels with respect to each other. Within hierarchical relationships, there is often the implication that when a given "superior" node in the hierarchy has a set of subordinates, information for the subordinates "rolls up" to the superior, often across multiple levels. This is especially useful within the system 30 for determining which members of an entity have access to certain sets of information, which entity members get "credit" for sales or other actions taken by subordinate entity members, and the reporting relationship between entity members. These entity relationships may be represented by special types of data tables known as assignment tables and hierarchy tables.

As an illustrative example, a hierarchical relationship may be established for members of the "employee" entity of an organization with four levels of relationships, as shown below in Table 2.

TABLE 2

| Employee (Upper) | Employee (Lower) |
|---|---|
| Joseph Black | Jane Smith |
| Jane Smith | Thomas Reed |
| Jane Smith | Frank Wright |
| Thomas Reed | Linda Berman |
| Thomas Reed | Bob White |

At the top level, Joseph Black serves as the "superior" node. Jane Smith is at the second level and subordinate to Joseph Black, but is superior to Thomas Reed and Frank Wright, who are at the third level. Thomas Reed is in turn superior to Linda Berman and Bob White, who are located at the lowest level of the hierarchy. In a SPM system, such as the present system 30, there are many business cases where information for employees at lower levels, including the lowest level (Linda Berman and Bob White), would "roll up" to the employee at the top level (Joseph Black). For example, Joseph Black may have access to information in the system 30 related to all employees who are subordinate to him in the employee hierarchy. In addition, credit for sales transactions, which are used in compensation calculations, may "roll up" in the sense that Joseph Black gets credit for all sales made by Linda Berman and Bob White because they indirectly report to him. As another example, workflow requests entered by Linda Berman and Bob White may be visible to Joseph Black at the highest level for approval or monitoring purposes.

Figure 14A:
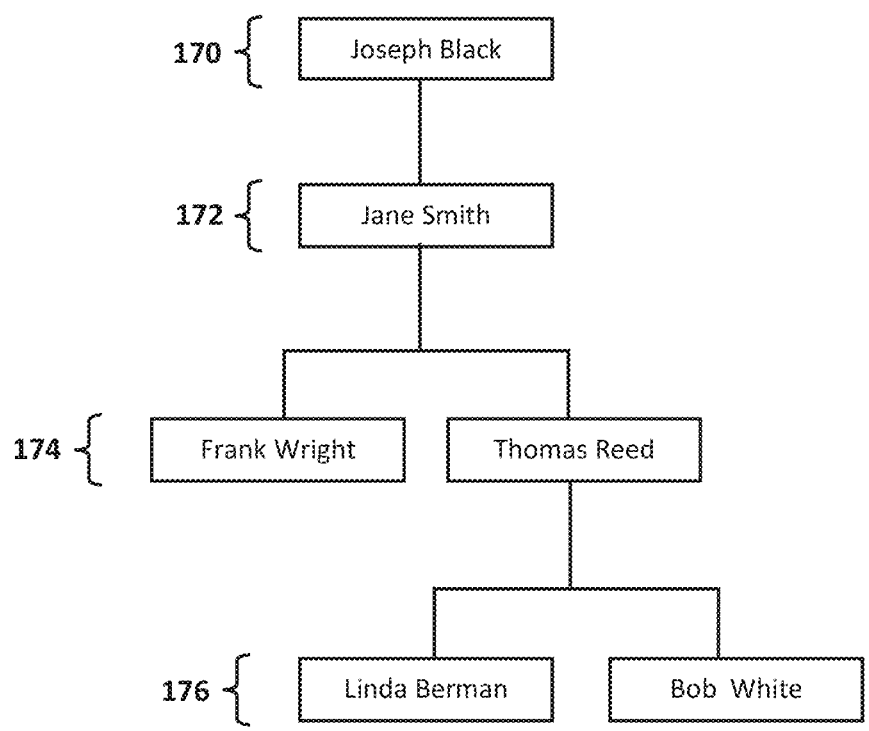
FIG. 14A is a tree view representation of a hierarchical relationship.
Figure 14B:
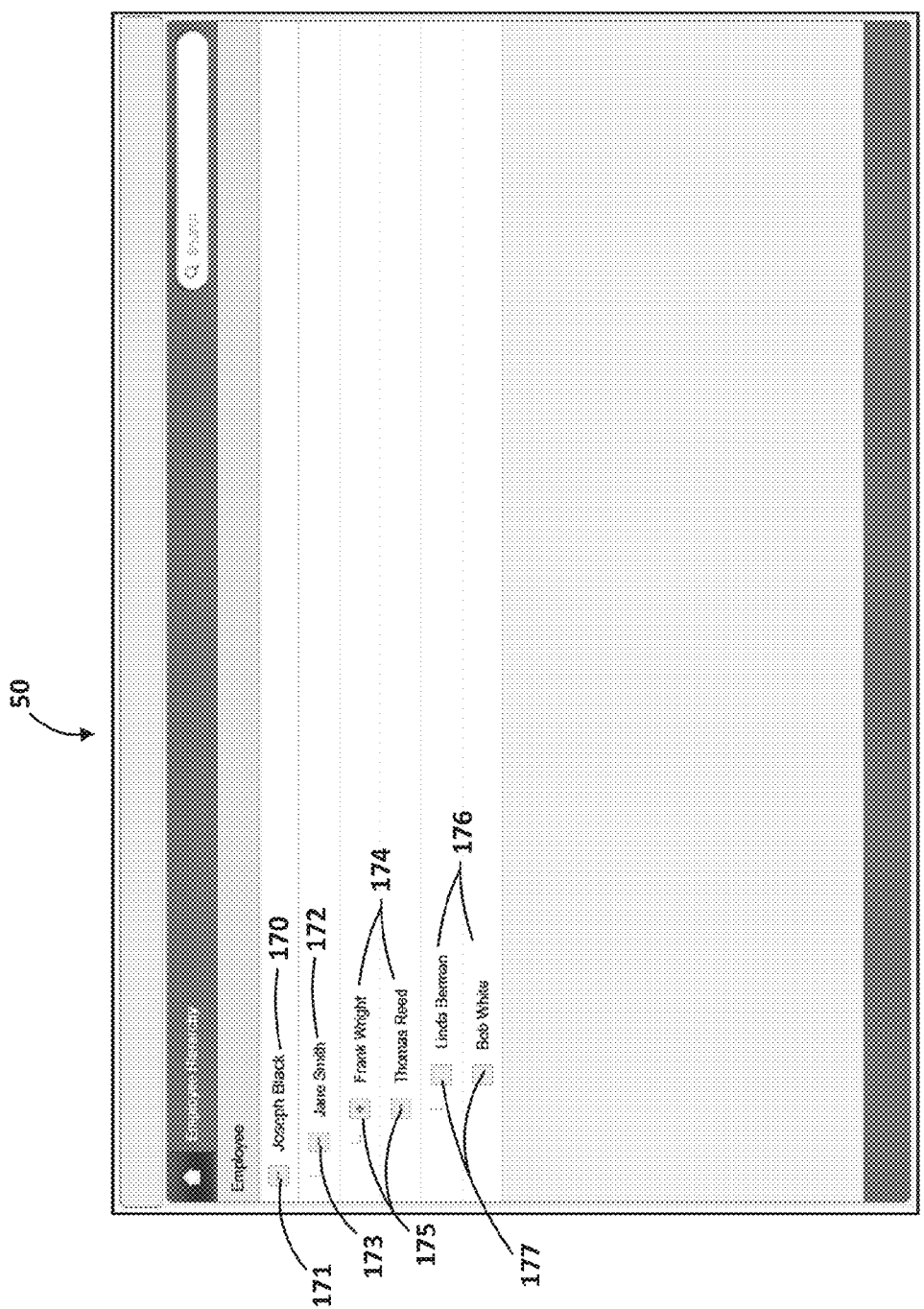
FIG. 14B is a screenshot illustrating an interactive tree view of the hierarchical relationship shown in FIG. 14A.

An additional characteristic of hierarchical relationships is that they are typically represented more meaningfully through a tree view as opposed to a table view. FIG. 14A illustrates a tree view representation of the data shown in Table 2. Joseph Black is at the top level 170 and superior to the remaining members of the employee entity in this hierarchy. The second level 172 of the hierarchy consists of Jane Smith, while the third level 174 of the hierarchy consists of Frank Wright and Thomas Reed, both of whom are subordinate to Jane Smith. Linda Berman and Bob White are both subordinate to Thomas Reed, and are located at the lowest level 176 of the hierarchy. As shown in FIG. 14B, the graphical user interface 50 may be configured to display an interactive tree view representation of a hierarchical relationship and the associated data, such as the data shown in Table 2. Each node displayed by the graphical user interface 50 may be expanded or collapsed in response to a user input, such as for example and without limitation, selecting the node via the input device 42. Joseph Black, who is at the top level 170, is represented in the graphical user interface 50 as a top level node 171, which may be expanded to display the employees that are subordinate to Joseph Black, or collapsed to hide those employees. Jane Smith, who is at the second level 172, is represented as a second level node 173, which is shown in the expanded state to display the employees that are subordinate to Jane Smith. Third level 174 employees Frank Wright and Thomas Reed are represented as third level nodes 175, with Frank Wright's node being collapsed, since Frank Wright does not have any subordinate employees. Thomas Reed's node is shown in the expanded state to display subordinate employees Linda Berman and Bob White, who are at the lower level 176 and represented as lowest level nodes 177. Such an interactive tree view representation is advantageous in that the user may selectively expand and collapse nodes to view the hierarchy at different levels of detail, and easily determine the hierarchical relationship between specific entity instances. When utilizing hierarchical relationships in conjunction with other data tables or processes, the present system 30 may provide explicit options to the user to indicate which levels of a hierarchy are to be used. Such a feature may be configured to ensure that the process of iterating through a hierarchy is handled correctly and efficiently.

Data that represent a "flat" relationship between two entities, which would normally be stored in an assignment table, may also be represented as a hierarchy using a tree view to provide useful visual information regarding how the two entities are associated with each other. This is especially true when one entity is the "upper" entity, in which case each instance of the upper entity may act as a superior node, with many subordinate values that are instances of the "lower" entity. A tree view representation of such a hierarchical relationship can provide a means of visualizing the entity values in "groups." For example, Table 3 is a hierarchy table between an upper entity and a lower entity and does not include multiple levels in the same way as the hierarchy shown in Table 2. Instead, the hierarchy table of Table 3 illustrates an essentially flat relationship between the "Product Category" entity and the "Product" entity, where the product category entity is the "upper" entity in the sense that each product category may include multiple products.

TABLE 3

| Product Category (Upper) | Product (Lower) |
| --- | --- |
| Hardware | HR1 Hard Drive |
| Hardware | AX45 Hard Drive |
| Software | Processing Suite |
| Software | Data Center Regulation |

Figure 15A:
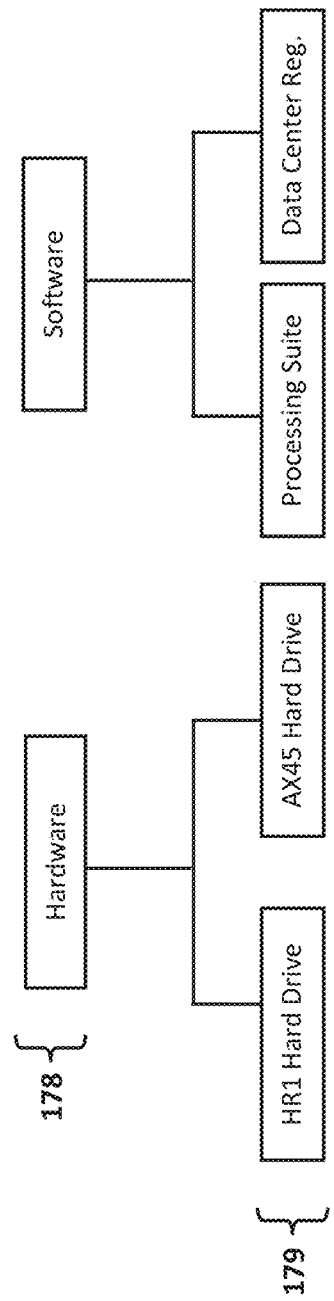
FIG. 15A is a tree view representation of an assignment relationship.

However, a user may still find it useful to view the information in a tree view representation, as shown in FIG. 15A, in which the upper product category entity 178 includes two separate instances of the entity—hardware and software. Each one of these entity instances are then associated with instances of the lower product entity 179.

Figure 15B:
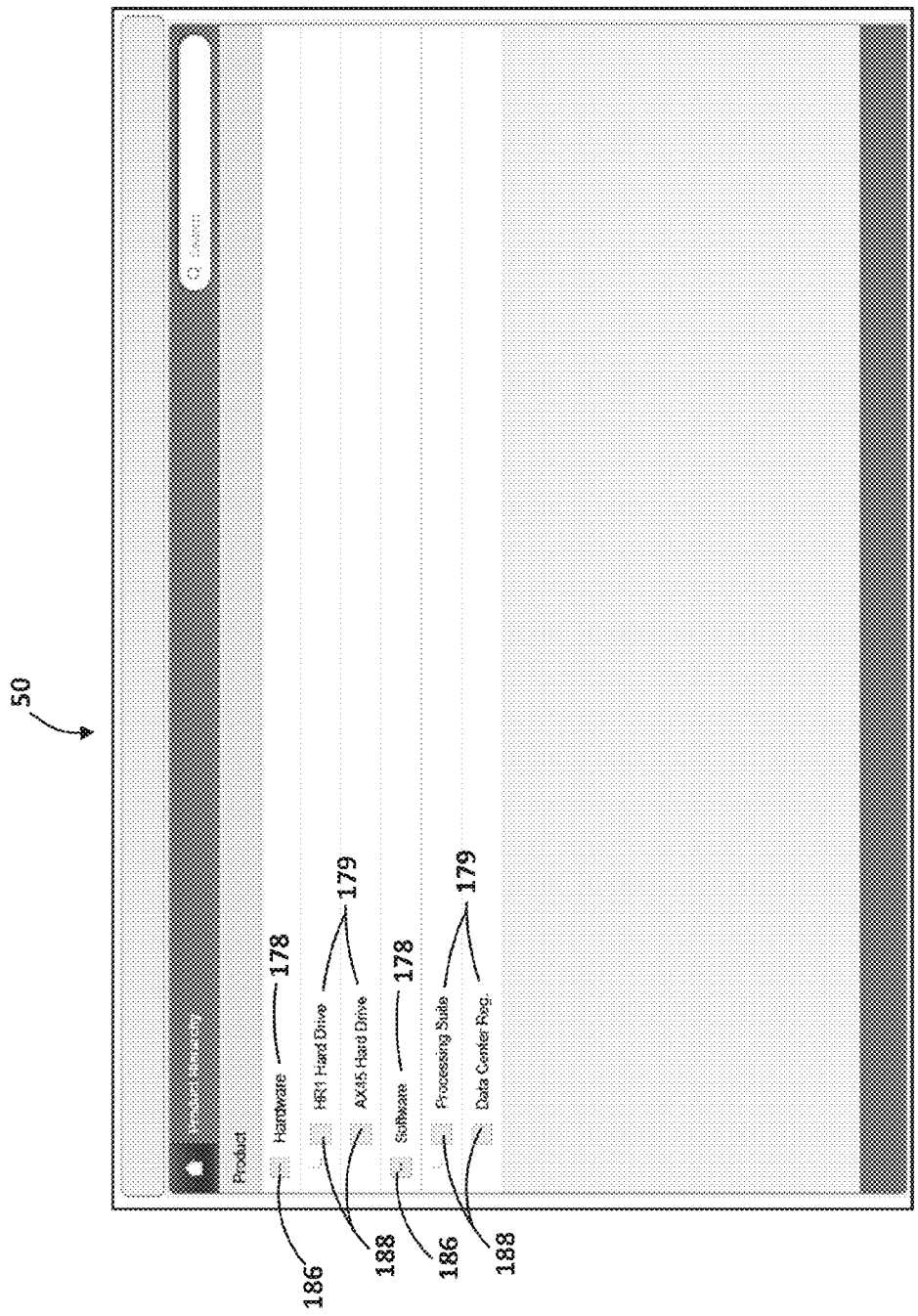
FIG. 15B is a screenshot illustrating an interactive tree view of the hierarchical relationship shown in FIG. 15A.

The hierarchy data shown in Table 3 may also be represented as an interactive tree view through the graphical user interface 50, as shown in FIG. 15B. The upper product category entity 178 is represented as two upper nodes 186, one for the "Hardware" instance of the entity and another for the "Software" instance of the entity. The upper nodes 186 may be expanded or collapsed as described above with respect to the hierarchy shown in FIG. 14B. The lower product entity 179 is represented as lower nodes 188 that are each associated with and grouped under one of the upper nodes 186. Specifically, the upper node 186 for the "Hardware" instance of the upper entity 178 is shown in the expanded state to display the two associated lower nodes 188 for the "HR1 Hard Drive" and "AX45 Hard Drive" instances of the lower entity 179. Similarly, the upper node 186 for the "Software" instance of the upper entity 178 is shown in the expanded state to display the two associated lower nodes 188 for the "Processing Suite" and "Data Center Reg." instances of the lower entity 179. By collapsing and expanding the upper nodes 186, the user may view specific groupings and relationships within the hierarchical relationship.

In circumstances where the relationship between two entities is flat (i.e., there is no need for the system to iterate through multiple levels of the relationship when carrying out a business process), and there is more of a one-to-one relationship between instances of the two entities, the relationship is better represented as an assignment relationship than a hierarchical relationship. As an example, an assignment relationship is well suited for representing the relationship between the "Sales Territory" entity and "Employee" entity, where each instance of the sales territory entity represents a specific geography assigned to an instance of the employee entity (i.e., a salesperson), as shown by the assignment table of Table 4 below.

TABLE 4

| Sales Territory | Employee |
| --- | --- |
| Upper Northeast | Joe Smith |
| Lower Northeast | Anne Black |
| Midwest | Bob Thomas |
| West | Frank Reese |

As discussed in detail above, each entity and its associated data values are stored in a corresponding entity table. There are numerous business cases in which entity data values from separate data tables must be joined together for compensation calculations or other SPM processes. For example, sales quotas may be defined for each sales territory, and thus may be stored in a data table by territory. Sales transactions may occur within different sales territories, and thus may be stored in a different data table by territory. Both sales quotas and sales transactions must be "assigned" to the proper instance of the employee entity to calculate that employee's compensation. The use of assignment tables enables the present system 30 to represent such assignment relationships without having to store extraneous information regarding the employee entity in each of the data tables containing sales quotas and sales transaction information. This is especially important because an assignment relationship may change over time, therefore maintaining the relationship data in a single assignment table means any changes to such data only need to be made in one place, as opposed to in every data table that utilizes this relationship. This same is true of hierarchy tables in the present system 30. For example, the reporting relationship represented by the employee hierarchy shown in Table 2 and FIGS. 14A-14B is likely to change as certain employees are promoted, change departments, leave the organization, or when new employees are hired and become part of the hierarchy. Similarly, the assignment relationship between the sales territory and employee entities shown in Table 4 may change when employees are reassigned, join or leave the organization, when new employees are hired, or when sales territories are redefined.

To reflect the fact that relationship between entities may change over time, the present system 30 may include a feature that permits records in assignment and hierarchy tables to be stored by effective dates or time periods. In other words, an assignment or hierarchy table may include data fields that store data values regarding a period of time during which the associated relationship is valid. Using the sales territory and employee assignment relationship shown in Table 4 as an example, the Lower Northeast sales territory may be associated with two different employees, one employee during one time period and another employee during another time period. These time periods may overlap for different combinations of instances of the sales territory and employee entity or may be totally different, but may not overlap for the same sales territory/employee combination. Effective dating may be reflected in the assignment table by a "start date" data field and an "end date" data field, as shown below in Table 5. The assignment relationship between the "Lower Northeast" sales territory and the employee "Anne Black" is valid from Mar. 15, 2000 until Oct. 31, 2010, after which date the system 30 will no longer associate these entities with each other. A new assignment relationship is created between the "Lower Northeast" sales territory and the employee "Tom Cross" and is valid as of 2007 Nov. 1. The other assignment relationships without any data values in the "end date" data field are also valid as of the start date, and will remain so until an end date is specified.

TABLE 5

| Sales Territory | Employee | Start Date | End Date |
| --- | --- | --- | --- |
| Upper Northeast | Joe Smith | 2006 May 01 | |
| Lower Northeast | Anne Black | 2000 Mar. 15 | 2010 Oct. 31 |
| Lower Northeast | Tom Cross | 2007 Nov. 01 | |
| Midwest | Bob Thomas | 2005 Jul. 01 | |
| West | Frank Reese | 2006 Oct. 01 | |

In order to represent assignment and hierarchal relationships between entities and utilize them in conjunction with other SPM functions, while taking advantage of the unique functionalities provided by entity tables, the present system 30 may include special features for creating assignment tables and hierarchy tables. These assignment and hierarchy tables may be used in various components of the system 30, such as to establish an assignment relationship between the earnings entity and payment entity of a plan, to credit sales transactions made by one entity to another entity, or between different levels of the same entity, or to limit data records that may be viewed or accessed by a particular user. In addition, when defining conditions for assigning tasks to users to respond to requests in a workflow process, an assignment or hierarchy table may be used to determine the user entity for the assignment.

Figure 16:
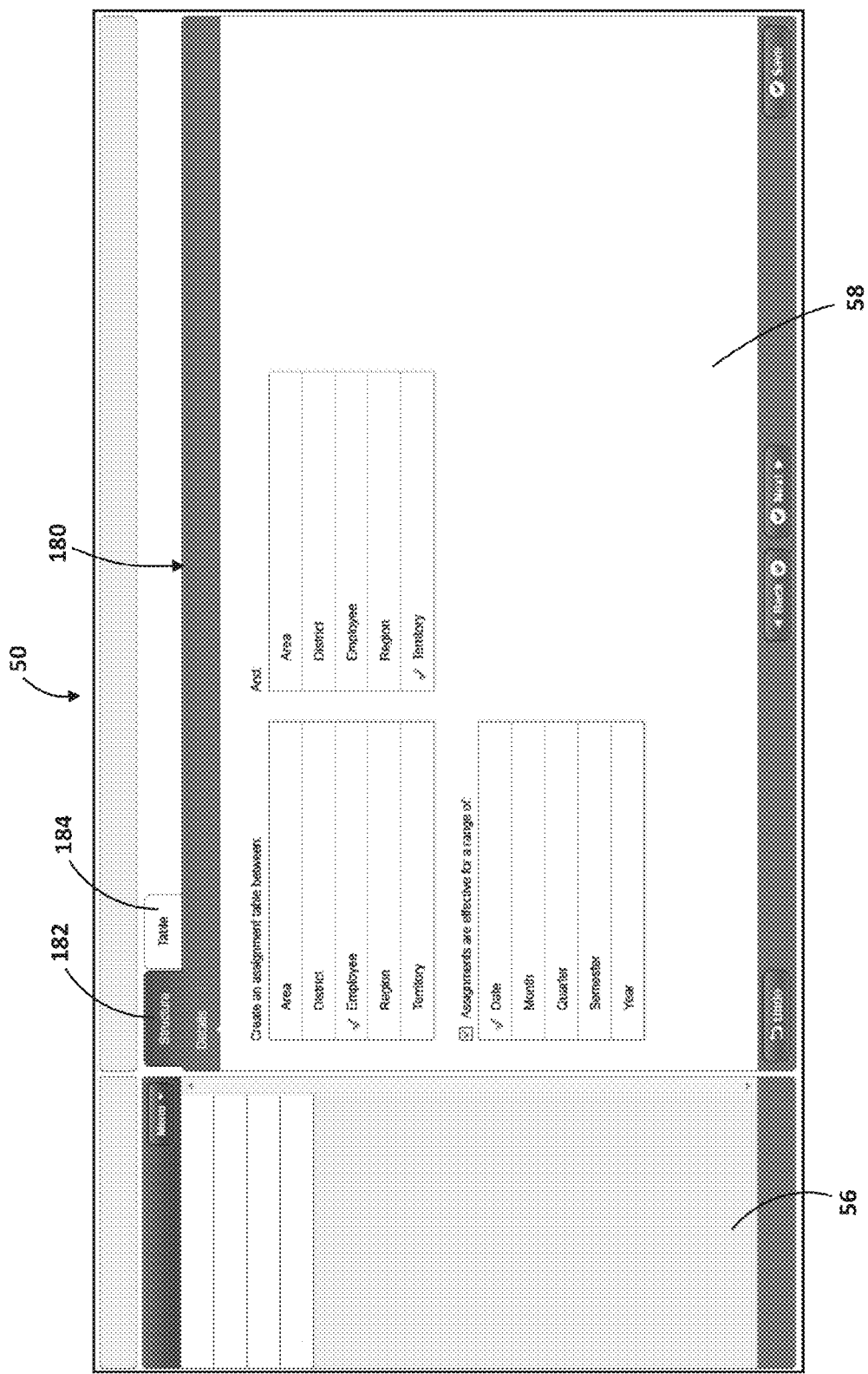
FIG. 16 is a screenshot illustrating a portion of the graphical user interface shown in FIG. 6 related to defining assignment tables.

To create assignment and hierarchy tables, the graphical user interface 50 of the present system 30 may include a component configured to provide guidance, present options, and receive user inputs for defining the structure of these special data tables. As shown in FIG. 16, the graphical user interface 50 may include an assignment setup element 180 for defining assignment relationships between entities. By providing a separate feature to define assignment relationships and set up the corresponding assignment tables, the system 30 may distinguish these objects from ordinary data tables whenever they are used. Although not shown, the graphical user interface 50 may also include an element that allows the user to specify a name for the assignment table, similar to the entity selection element 52 discussed above and shown in FIGS. 5A and 5B. After specifying a name, the user may complete the definition of the associated assignment table using various menus and options in the assignment setup element 180, which may include various tabbed pages and subpages as discussed above with respect to the structure element 80, thus breaking down the definition of the assignment table into logical steps or parts.

FIG. 16 illustrates a potential embodiment of the assignment setup element 180, which may be presented in the right hand pane 58 of the graphical user interface 50. The assignment setup element 180 may include an assignment structure element 182 in the form of a tabbed page, which may in turn include various sub-tabs, and an assignment table element 184 in the form of a tabbed page for displaying a representation of the assignment table to the user. The assignment setup element 180 may be used to set up an assignment relationship, such as the exemplary Employee-Territory assignment table 190 shown in FIG. 17. In order to create an assignment table by defining an assignment relationship between two entities, those entities must have already been created in the system 30 with associated entity tables 60. As shown in FIG. 16, the assignment structure element 182 may provide an interface for selecting the two different entities involved in the assignment relationship, such as by presenting the available entities in the system 30 in a menu format. In this example, the entities "employee" and "territory" are selected. If the user attempts to select the same entity twice for an assignment relationship, the graphical user interface 50 may be configured to display an error message and may not allow the user to proceed until two distinct entities have been selected. A relationship between instances of the same entity is generally of a reporting nature, and should be defined using a hierarchy as further discussed below.

Because assignment relationships may change over time, the assignment structure element 182 may further include an option to store the assignments by a range of dates or periods, which is often referred to in the SPM field as "effective dating." As shown in FIG. 16, where effective dating of the assignments is elected, the assignment structure element 182 may prompt the user to select the period from a list of predefined time units, such as for example and without limitation, date, month, quarter, semester, or year. The assignment structure element 182 may also permit the user to specify custom time units. Although not shown in FIG. 16, the assignment structure element 182 may also include an audit options element, similar to the audit options element 88 shown in FIG. 9, which allows the user to select whether changes to records in the assignment table 190 should be tracked in an audit log.

Figure 17:
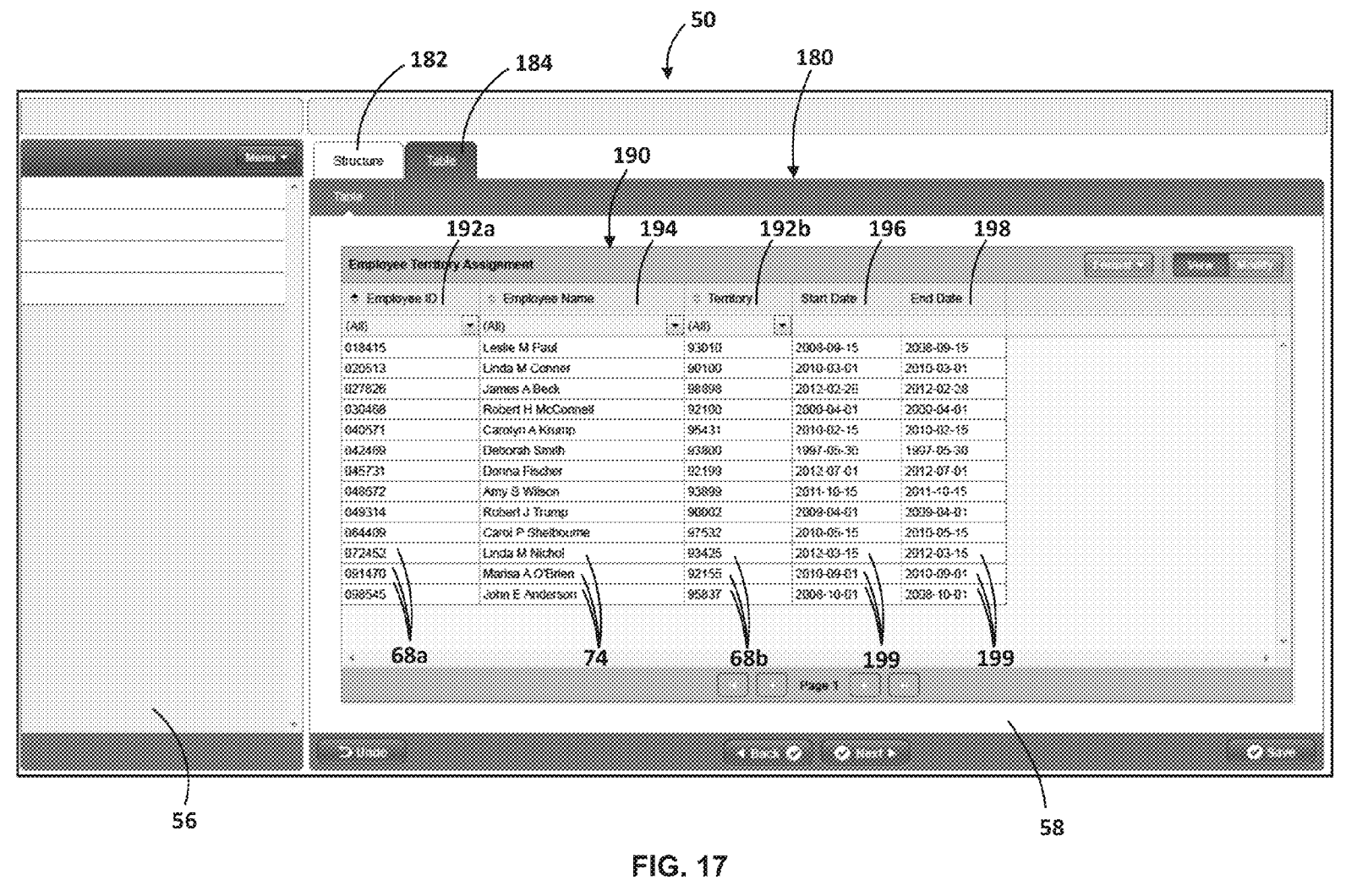

After the user sets up the assignment relationship using the assignment structure element 182, the user may use an optional confirmation component, such as the "save" button shown in FIG. 16, to confirm that the assignment table 190 is ready to be created or updated. For each of the two entities selected for the assignment, the system 30 displays the associated explicit entity ID values 68*a*, 68*b* in an ID display field 192*a*, 192*b* of the assignment table 190, but only stores the associated internal entity ID values in the assignment table 190. FIG. 17 illustrates the Employee-Territory assignment table 190 as it is displayed to the user through the graphical user interface 50. Any entity attribute field that is specified as a "display" field of the entity table associated with the two assignment entities may be displayed in the assignment table 190, with the entity attribute values 74 being displayed (but not stored) in an attribute display field 194 of the assignment table 90. As discussed above with respect to data tables 90, 100, the only entity values stored in the assignment table 190 are the internal entity ID values, which do not change and are used by the assignment table 190 to query and retrieve the associated entity values for display. If the effective dating option is selected, the system 30 also displays and stores the appropriate dating values in an effective start field 196 and an effective end field 198 of the assignment table 190. Where the effective periods of the assignment are indicated by a range of dates, such as in the assignment table 190 of FIG. 17, data values reflecting the start and end dates 199 are displayed in the effective start field 196 and effective end field 198, respectively. Where the effective periods of the assignment are indicated by a range of time periods, data values reflecting the starting and end time periods are displayed in the effective start field 196 and effective end field 198, respectively. In the exemplary assignment table 190 of FIG. 17, each instance of the employee entity is uniquely identified by employee ID numbers, which are displayed in a first ID display field 192a. To describe each employee in a manner that a user can easily recognize, entity attribute values 74 in the form of employee names are displayed in the attribute display field 194 of the assignment table 190. Each instance of the employee entity is in an assignment relationship and thus associated with an instance of the territory entity, which is uniquely identified by a territory number displayed in a second ID display field 192b. The start and end dates 199 displayed in the effective start and end fields 196, 198 of the assignment table 190 dictate the time period during which each assignment between the employee and territory entities is valid.

Both the first and second ID display fields 192a, 192b are treated as key fields in the assignment table 190, meaning that the system 30 ensures that only one record can exist with a distinct combination of entity values for the two entities, unless the assignment table 190 stores assignments by a range of effective dates or periods. Like other data tables 90, 100 in the system 30, the set up of assignment tables 190 may include a validation feature configured to ensure that a user selected explicit entity ID value to be displayed in one of the ID display fields 192a, 192b is a valid explicit entity ID value that exists in the associated entity table. Where the user selected explicit entity ID value is valid, the system 30 retrieves the associated internal entity ID value to be stored in the assignment table 190 and displays the user selected explicit entity ID value in one of the ID display fields 192a, 192b. However, if the user attempts to enter an explicit entity ID value that does not exist in the entity table, the system 30 will not allow the data value to be added to the assignment table 190, and may present an error message to the user identifying the error. The same validation procedure may be performed when the user edits any records of the assignment table 190 using the assignment table element 184 of the graphical user interface 50.

Figure 18:
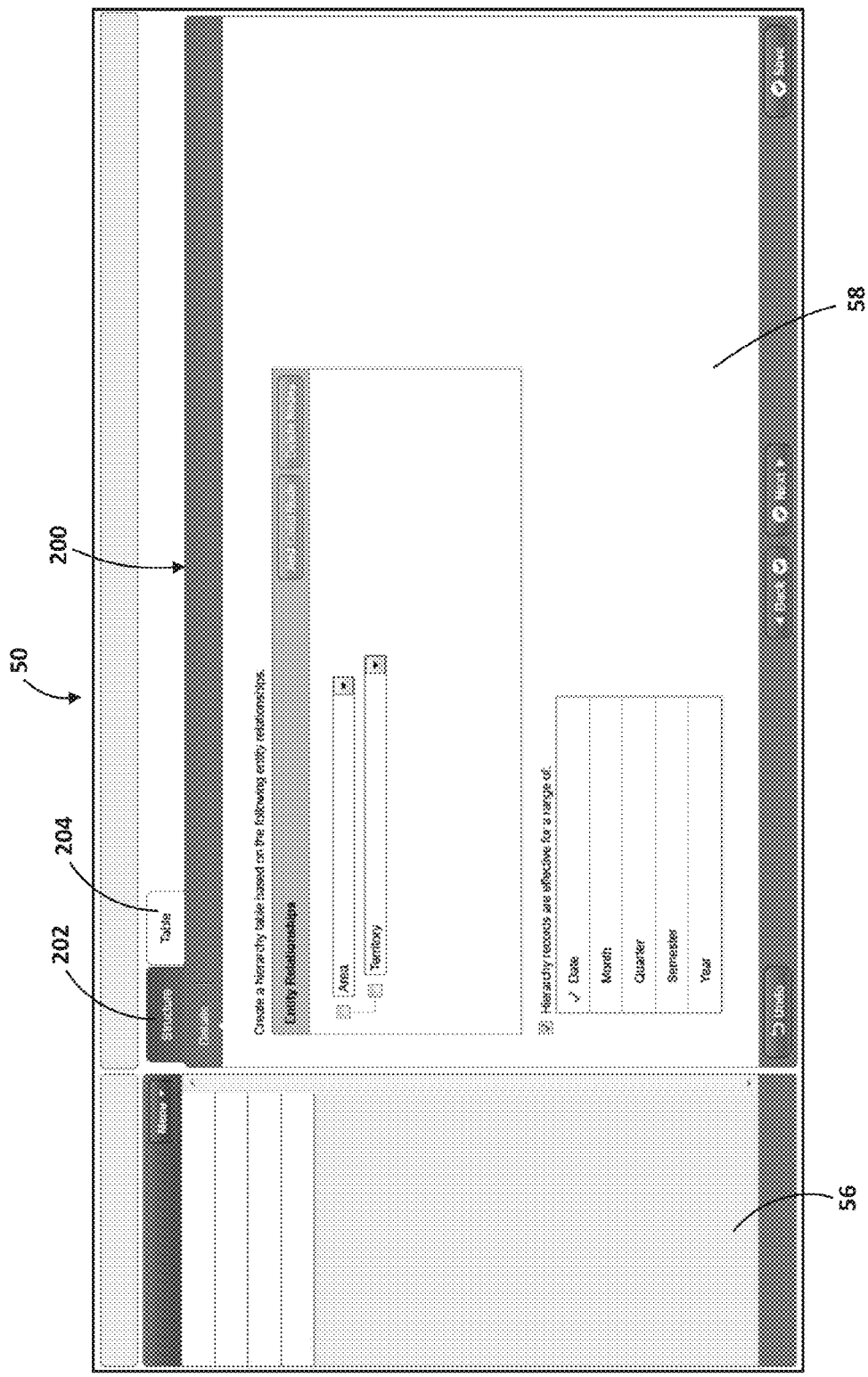
FIG. 18 is a screenshot illustrating a portion of the graphical user interface shown in FIG. 6 related to defining hierarchy tables.

The graphical user interface 50 of the present system 30 may further include a component configured to provide guidance, present options, and receive user input for defining a hierarchical relationship between different entities or instances of the same entity. As shown in FIG. 18, the graphical user interface 50 may include a hierarchy setup element 200 for defining a hierarchical relationship and set up the corresponding hierarchy tables to store information regarding the relationships that make up the hierarchy. By providing a separate feature to define hierarchy relationships, the system 30 may distinguish these objects from ordinary data tables whenever they are used. Although not shown, the graphical user interface 50 may include an element that allows the user to specify a name for the hierarchy that is being set up, similar to the entity selection element 52 discussed with respect to FIGS. 5A and 5B. Multiple hierarchy tables may be required for each hierarchy. It is to be understood that the steps of setting up a hierarchy may be combined with the steps of setting up the hierarchy tables that store the hierarchy data, and all these steps may be performed using the hierarchy setup element 200 of the graphical user interface. After specifying a name for the hierarchy, the user may complete the definition of the hierarchy and the associated hierarchy tables using various menus and options in the hierarchy setup element 200, which may include various tabbed pages and sub-pages to break down the definition process into logical steps or parts.

FIG. 18 illustrates a potential embodiment of the hierarchy setup element 200, which may be presented in the right hand pane 58 of the graphical user interface 50. The hierarchy setup element 200 may include a hierarchy structure element 202 in the form of a tabbed page, which may in turn include various sub-tabs, and a hierarchy table element 204 in the form of a tabbed page for displaying representations of the hierarchy tables to the user. Although not shown in FIG. 18, the hierarchy structure element 202 may include an audit options element in the form of a sub-tab, which allows the user to select whether changes to the hierarchy and associated hierarchy tables should be tracked in an audit log.

As discussed above, a hierarchy represents relationships between one or more pairs of entities. The entity pairs may be instances of the same entity (e.g., between different instances of the employee entity), or different entities (e.g., between the area and district entities, and between the district and territory entities). For each pair of entities in the hierarchy, one represents the "upper" entity and the other represents the "lower" entity. For example, in an employee to employee hierarchy, the "upper" employee entity represents the employees who have subordinates, while the "lower" employee entity represents employees who are subordinates (i.e., those employees that report to those represented as "upper" employee entities). It is possible for an employee to be both an "upper" and a "lower" entity, where the employee is in the middle of the reporting structure and thus has subordinates while also being subordinate to other employees.

Figure 19:
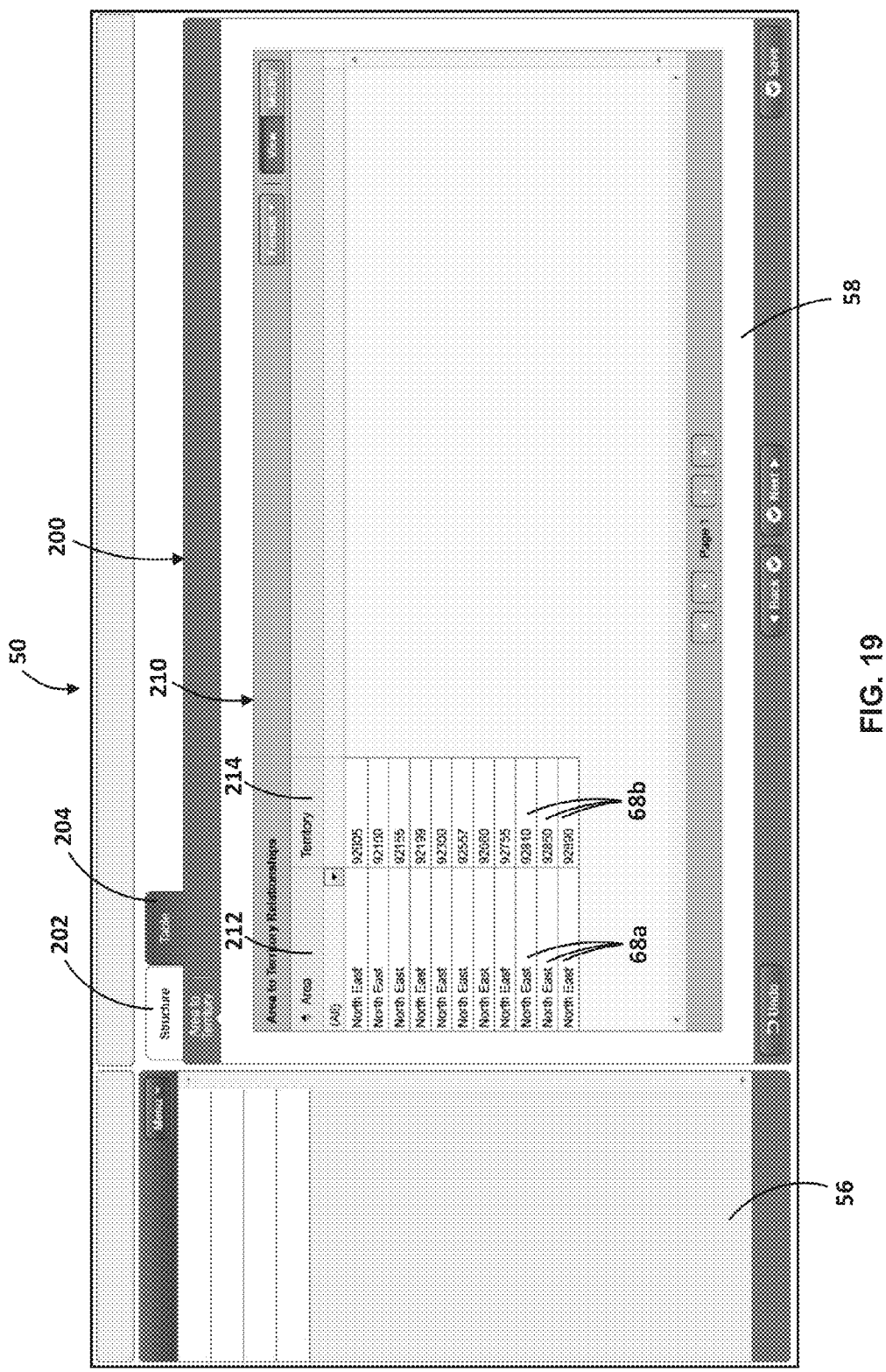
FIG. 19 is a screenshot illustrating data displayed in an exemplary hierarchy table.

The hierarchy structure element 202 provides a clear interface that may guide the user in defining the pairs of entities in such an "upper" and "lower" hierarchy relationship. Similar to the assignment structure element 182 of FIG. 16, the hierarchy structure element 202 may be configured to only display entities that have already been defined in the system for use in the hierarchy. FIG. 19 illustrates an exemplary Area-Territory hierarchy table 210 as it is displayed to the user through the graphical user interface 50, in which the "area" entity represents the "upper" entity and the "territory" entity represents the "lower" entity, meaning that each instance of the area entity is higher in a reporting or other structure than instances of the territory entity. As shown in FIG. 18, the hierarchy structure element 202 may provide an interface for selecting the "top level" entity in the hierarchy, in this example the "area" entity, and then adding additional "child nodes" to represent "lower level" entities in the hierarchy. In this example, the "territory" entity has been selected as a child node (i.e., lower level entity) to the "area" entity. Although the example shown in FIGS. 18 and 19 only utilizes two entities in the hierarchy relationship, it is to be understood that additional entities may also be utilized in the relationship. For example and without limitation, instead of the "territory" entity being directly subordinate to the "area" entity, the "district" entity may be added as a child node to the "area" entity, and then the "territory" entity may be added as a child node to the "district" entity, resulting in an area→district→territory hierarchy in which each area includes one or more districts, and each district includes one or more territories.

As discussed above with respect to assignment relationships, the hierarchy structure element 202 may include an option to store hierarchical relationships by a range of dates or periods to reflect changes in the hierarchy over time. As shown in FIG. 18, where effective dating of the hierarchy is elected, the hierarchy structure element 202 may prompt the user to select the effective period from a list of predefined time units, or to specify custom time units. Once the user sets up the basic structure of the hierarchy by identifying the upper and lower entities and optional effective dating, the user may use a confirmation component, such as the "save" button shown in FIG. 18, to confirm that the hierarchy tables associated with the hierarchy is ready to be created or updated. One hierarchy table is created for each pair of entities in a hierarchy. In the example hierarchy shown in FIGS. 18 and 19, only one pair of entities are used in the hierarchy (i.e. the area and territory entities), thus only one hierarchy table 210 is created. However, if the "district" entity is added to the hierarchy, two hierarchy tables would be required—one for the area/district entity pair and another one for the district/territory entity pair. In other words, a separate hierarchy table is required for each upper/lower entity relationship in a hierarchy.

As shown in the area/territory hierarchy table 210 of FIG. 19, the explicit entity ID values 68a for the higher level "area" entity are displayed in an upper entity field 212 of the hierarchy table 210 labeled "Area," and the explicit entity ID values 68b for the lower level "territory" entity are displayed in a lower entity field 214 labeled "Territory." Similar to assignment tables 190 and other data tables 90, 100 in the system 30, the explicit entity ID values are not actually stored in the hierarchy table 210. Instead, the internal entity ID values associated with those explicit entity ID values of the upper and lower entities are stored in the hierarchy table 210, and the system 30 utilizes those internal entity ID values to query and retrieve the associated entity values for display in the upper and lower entity fields 212, 214. If the "district" entity is added to the hierarchy and two hierarchy tables are created, the area/district hierarchy table would display the area entity values in the upper entity field 212 and the district entity values in the lower entity field 214, while the district/territory hierarchy table would display the district entity values in the upper entity field 212 and the territory entity values in the lower entity field 214.

If the effective dating option is selected, the hierarchy table 210 may also include an effective start field and an effective end field to store the relevant start and end dates or time periods. Although the effective start and end fields are not shown in the hierarchy table 210 of FIG. 19, one of ordinary skill in the art would appreciate that they operate in the same manner as the effective start and end fields 196, 198 of the assignment table 190 shown in FIG. 17 and may be configured to accept the same types of data. Both the upper entity field 212 and the lower entity field 214 are treated as key fields in the hierarchy table 210, in a similar manner as key fields in the assignment table 190. Furthermore, the hierarchy table 210 may also include a validation feature as described above with respect to the assignment table 190, so that any user selected or edited explicit entity ID value to be displayed in the hierarchy table 210 must be a valid entity value that is already stored in an entity table 60. Like other data tables 90, 100 in the system 30, explicit entity ID values may be added to the hierarchy table 210 through a manual input, a user directed data load, or an automated process. The validation feature ensures that every entity record entered in the hierarchy table 210 is valid, so that the system 30 may use the supplied explicit entity ID values to find the associated internal entity ID values to be stored in the hierarchy able 210.

One of ordinary skill in the art would appreciate that the graphical user interface 50 shown in FIGS. 5A-9, 11-13B, and 16-19 is merely one possible embodiment presented for illustrative purposes, and is not intended to serve as limitations of alternative embodiments that would achieve the same purpose. In fact, the graphical user interface 50 may take numerous forms and configurations, and various modifications may be made without affecting its core functionalities. For example and without limitation, FIGS. 13A and 13B illustrate additional drop down menus 51, 53 that may be presented in the left hand pane 56 of the graphical user interface 50 to provide user with access to different system features. Furthermore, one of ordinary skill in the art would appreciate that although the components of the software 38 in system 30 are described separately with respect to each component's function, two or more of these components may be part of the same component, and may be executed simultaneously with each other. The components of the software 38 may be, for example and without limitation, in the form of software packages, software modules, software services, or software objects, and may be implemented or embedded within various virtual computer environments or hardware components.

FIG. 3 illustrates an alternative embodiment of a scalable SPM system 110 according to the present application for representing and utilizing data related to a business unit with significant meaning in SPM processes. While the system 30 shown in FIG. 2 represents a simplified configuration, the system 110 shown in FIG. 3 represents a scaled installation that includes redundancy and may be exposed to the internet, which is well suited for environments where there are a large number of users or where there is need for extensive storage and processing capabilities. Elements shown in dotted lines represent optional components and groupings within the system 110. Since the system 110 of FIG. 3 includes many of the same elements previously discussed with respect to the system 30 of FIG. 2, the same reference numerals are used to identify the same elements described above. The system 110 includes a storage device 34, which may contain a database 36 and software 38, which may be stored in the same or separate storage components within the storage device 34 and may be in communication with each other. The database 36 is configured to store entity tables and other data tables utilized by the system 110. The software 38 includes the components described above with respect to system 30, which are not repeated here for the sake of brevity. The storage device 34 is in communication with a database server 112, which allows other elements of the system 110 to access and read information stored in the database 36. The database server 112 is in communication with one or more logic servers 113, each of which is configured to perform a logical function. The logic servers 113 may include an application server 114, a process server 116, and a report server 118, each of which may be made up of a plurality of servers 1 to N and may include one or more processors 32. One of ordinary skill in the art would understand that each of the servers described with respect to FIG. 3 may be made up of separate servers in communication with each other, or may be combined together on a single physical or virtual server. In addition, the storage device 34, database server 112, and logic servers 113 may all be part of the same physical device. The application server 114 is configured to permit user interaction with the system 110, and may be scaled as application servers 1 to N based on the number of users. The process server 116 is configured to perform data manipulations and other computing functions, and may be scaled as process servers 1 to N based on the amount of processing load on the system 110. The report server 118 is configured to generate customized report based on the information in the system 110, and may be scaled as report servers 1 to N based on the reporting requirements of the system 110. Instead of or in addition to being stored in the storage device 34 and accessed by the logic servers 113, the software 38 may be part of one or more of the application, process, and report servers 114, 116, 118.

As shown in FIG. 3, the logic servers 113 are in communication with one or more client devices 44, which may access the logic servers 113 through a network such as a local area network (LAN) or the internet. As discussed above with respect to the system 30 of FIG. 2, the client device 44 may include a display device and an input device to allow the user to interact with the system 110. The logic servers 113 may be in communication with a LAN client device 44a through an optional firewall 120, which may be software or hardware based and may be in communication with a web server 122. The web server 122 may be scaled as a plurality of web servers 1 to N, depending on the networking needs of the system 110. Although not a required component of the system 110, the web server 122 may be used to direct users accessing the system 110 to the appropriate application servers 114. The web server 122 may be in communication with an optional hardware load balancer 124, which is a network appliance that balances the load across a plurality of web servers 122, or directly across a plurality of application servers 114 if the system 110 does not include a web server 112. If the system 110 is implemented as a hosted solution where the storage device 34, database server 112, and logic servers 113 are hosted by an organization remotely from the end users, the firewall 120, web server 122, and hardware load balancer 124 are preferably provided by the hosting organization. The logic servers 113 may further be in communication with an internet client device 44b through another optional firewall 120 that secures the system 110 from the internet 126, through which a user may use the internet client device 44b to access the system 110.

The flow diagram of FIG. 1A illustrates an embodiment of a computer-implemented method of representing and utilizing data related to a business unit in a SPM system. Reference numerals for the elements shown in FIGS. 2-12 and discussed above are used for the same elements below, and detailed descriptions of those elements are omitted for sake of brevity. The present method may be implemented, for example and without limitation, in the SPM systems shown in FIGS. 2 and 3, or in any other computer system having suitable processing and storage capabilities. Portions of the flow diagrams shown in dotted lines represent optional groupings of steps. One of ordinary skill in the art would recognize that while each step of the flow diagrams of FIGS. 1A and 1B are shown and described separately, multiple steps may be executed in a different order than what is shown, in parallel with each other, or concurrently with each other.

As shown in FIG. 1A, the present computer-implemented method 130 includes a step 132 of receiving a user input selecting an entity name representing a business unit with significant meaning in SPM processes, and a step 134 of generating an entity table 60 associated with the entity name and configured to store data related to the business unit in a storage device 34. The entity table includes data fields 62 including an explicit entity ID field 64 and an internal entity ID field 66. As discussed above, the user input selecting an entity name may be made through a graphical user interface 50, such as the one shown in FIGS. 5A and 5B, which permits a user to select an entity name from a list of predetermined entity names or enter a custom user-specified entity name through an input device 42.

The method 130 further includes a step 136 of populating the explicit entity ID field 64 of the entity table 60 with explicit entity ID values 68 that each uniquely identifies an instance of the business unit, wherein no two explicit entity ID values 68 are identical. This step may include receiving a data input via a user interaction with the graphical user interface 50, and the data input may be in the form of a manual input, a user directed data load, or an automated process. To ensure that no two explicit entity ID values 68 entered into the system are identical, the method 130 may include a step 138 of checking whether each explicit entity ID value entered into the system is equal to an existing explicit entity ID value 68 in the entity table 60. If the entered explicit entity ID value already exists in the entity table 60, that value is not stored in the entity table 60, and the user may be alerted to the error or directed to reenter that explicit entity ID value. If the entered explicit entity ID value does not already exist in the entity table 60 (i.e., is a unique value), the method proceeds to the step 140 of generating a unique internal entity ID value 70 for each one of the explicit entity ID values 68. No two internal entity ID values 70 in the same entity table 60 may be the same, since each internal entity ID value 70 serves as a unique identifier for an explicit entity ID value 68, and is used by other data tables to reference and display that explicit entity ID value 68. The method further includes the step 142 of associating each internal entity ID value 70 with a corresponding one of the explicit entity ID values 68, and the step 144 of storing the internal entity ID values 70 in the internal entity ID field 66 of the entity table 60. These steps 140, 142, 144 may be executed in order, in parallel, or concurrently with each other. The method includes an additional step 146 of associating the entity table 60 with a separate data table 90, 100, such that at least one of the explicit entity ID values 68 is displayed, but not stored, in an ID display field 92 of the data table 90, 100 via a display device. Meanwhile, the corresponding internal entity ID value 70 associated with the at least one displayed explicit entity ID value 68 is stored in an ID storage field 93 of the data table 90, 100, but is not displayed to the user.

As discussed in detail above, the entity table 60 may include one or more entity attribute fields 72 that store entity attribute values 74 descriptive of one or more attributes of each instance of the entity. Where these entity attribute values 74 are to be displayed in the data table 90, 100, the method may further include a step of receiving a user input specifying an entity attribute field 72 as a display field of the data table 90, 100, and a step of displaying the entity attribute values 74 of the entity attribute field 72 in an attribute display field 94 of the data table 90, 100 without storing those entity attribute values 74 in the data table 90, 100. This allows the user to view and interact with the explicit entity ID values 68 and entity attribute values 74 of an entity in the data table 90, 100, without the need to store or update those data values in every data table that utilizes that entity. Since only the unchanging internal entity ID values 70 are stored in the data table 90, 100 that utilizes the entity associated with entity table 60, any changes made to the entity data values in the entity table 60 are automatically reflected in the data table 90, 100.

Figure 1B:
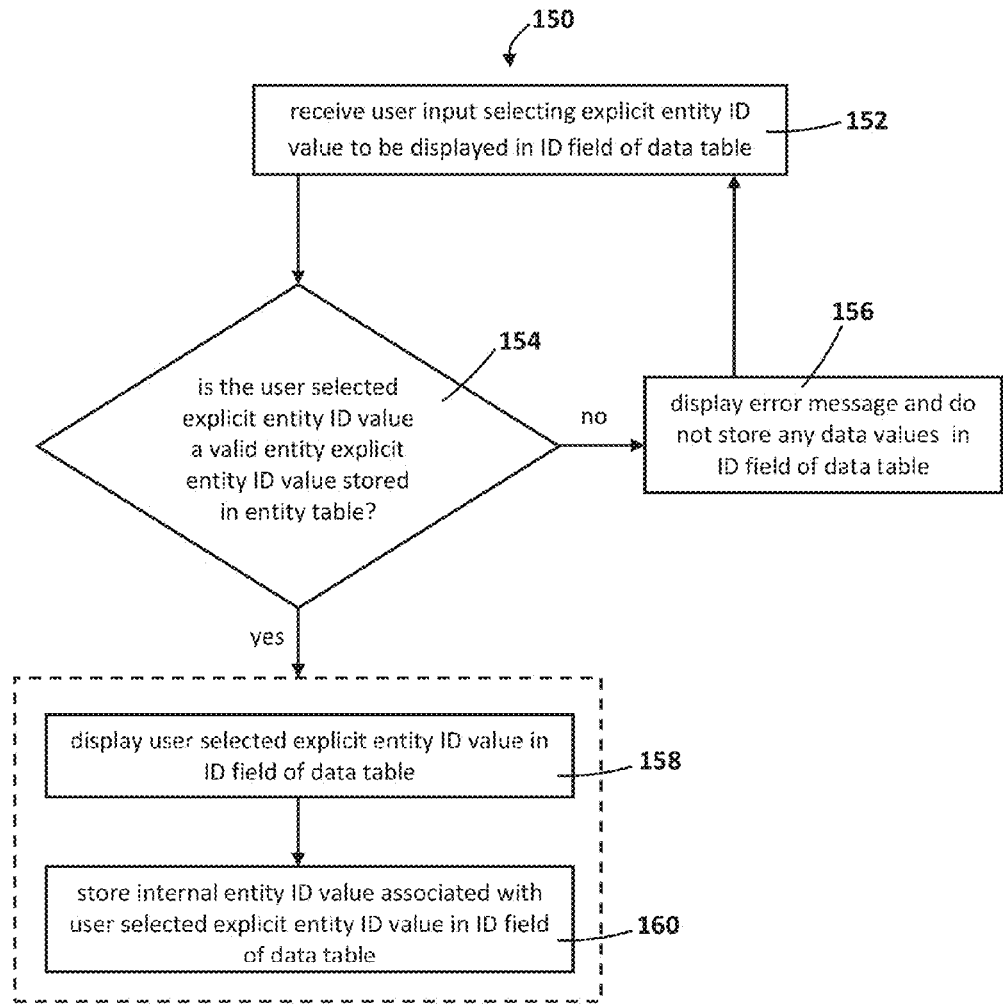
FIG. 1B is a flow diagram illustrating additional optional sub-steps of the flow diagram of FIG. 1.

FIG. 1B illustrates an optional validation method 150 that may be part of the step 146 of associating the entity table 60 with the data table 90, 100, to ensure that only valid explicit entity ID values 68 are entered into the data table 90, 100. The validation method 150 includes a step 152 of receiving a user input selecting the at least one explicit entity ID value 68 to be displayed in the ID display field 92 of the data table 90, 100, and a step 154 of checking whether the user selected explicit entity ID value is a valid explicit entity ID value 68 stored in the explicit entity ID field 64 of the entity table 60. If the user selected explicit entity ID value does not exist in the entity table 60, the method proceeds to a step 156 of displaying an error message via the graphical user interface 50, such as the sample error message illustrate in FIG. 11, without any data being stored in the ID display field 92 of the data table 90, 100. If the user selected explicit entity ID value is a valid entry that exists in the entity table 60, the method process to a step 158 of displaying the user selected explicit entity ID value in the ID display field 92, and a step 160 of storing the corresponding internal entity ID value 70 associated with the user selected explicit entity ID value in the ID storage field 93 of the data table 90, 100. Steps 158 and 160 may be executed in order, in parallel, or concurrently with each other.

The present invention may also be embodied in a computer software product that includes a non-transitory computer readable storage medium readable by a processor. The computer software product may be implemented in or utilized with, for example and without limitation, the SPM systems shown in FIGS. 2 and 3, or any other computer system having suitable processing and storage capabilities. Reference numerals for the elements shown in FIGS. 2-12 and discussed above are used for the same elements below, and detailed descriptions of those elements are omitted for sake of brevity. A set of instructions for representing and utilizing data related to a business unit is stored on the non-transitory computer readable storage medium, the instructions including a first sequence which, when executed by the processor 32, causes the processor 32 to receive a user input selecting an entity name representing the business unit. The instructions further include a second sequence which, when executed by the processor 32, causes the processor 32 to generate an entity table 60 associated with the entity name and configured to store data related to the business unit in a storage device 34, the entity table 60 having data fields 62 including an explicit entity ID field 64 and an internal entity ID field 66. A third sequence of instructions is executable by the processor 32 to populate the explicit entity ID field 64 of the entity table 60 with explicit entity ID values 68 that each uniquely identifies an instance of the business unit, wherein no two explicit entity ID values 68 are the same. The instructions also include a fourth sequence of instructions executable by the processor 32 to generate a unique internal entity ID value 70 for each one of the explicit entity ID values 68, a fifth sequence of instructions executable by the processor 32 to associate each internal entity ID value 70 with a corresponding one of the explicit entity ID values 68, and a sixth sequence of instructions executable by the processor 32 to store the internal entity ID values 70 in the internal entity ID field 66 of the entity table 70. A seventh sequence of instructions is executable by the processor 32 to associate the entity table 60 with a data table 90, 100, such that at least one of the explicit entity ID values 68 is displayed, but not stored, in an ID display field 92 of the data table 90, 100 via a display device 40. Meanwhile, the corresponding internal entity ID value 70 associated with the at least one displayed explicit entity ID value 68 is stored in an ID storage field 93 of the data table 90, 100, but is not displayed to the user.

One of ordinary skill in the art would appreciate that the systems 30, 100 illustrated and described herein are merely exemplary representatives of systems that may embody the present invention, and that various other system types and configurations are also suitable for use with the invention. The software and hardware components described above with respect to systems 30, 100 may also take on other variations, modifications, and alternatives without departing from the spirit of the present invention.

The storage device 34 shown in FIGS. 2 and 3 may be or include a memory device such as a Dynamic Random Access Memory (D-RAM), Static RAM (S-RAM), other RAM, a flash memory, or any other suitable computer-readable medium. The storage device 34 may further be or include a hard disk, a solid-state drive (SSD), a magnetic recording apparatus, a magneto-optical medium, an optical medium such as a compact disc—read only memory (CD-ROM), a digital versatile disk (DVD), a Blue-Ray disk (BD), or any other type of computer-readable medium or suitable device for electronic data storage. As used herein, the term "computer-readable medium" broadly refers to any storage medium that may store or transfer information, including volatile, nonvolatile, removable, and non-removable media. Specifically, computer-readable medium may include a non-transitory computer readable storage medium.

The database 36 shown in FIGS. 2 and 3 may be spread across one or more non-transitory computer-readable mediums, and may be or include one or more relational databases, hierarchical databases, object-oriented databases, one or more flat files, one or more spreadsheets, and/or one or more structured files. The database may be managed by one or more database management systems, which may be based on a technology such as, for example and without limitation, Microsoft SQL Server, MySQL, PostgreSQL, Oracle Relational Database Management System (RDBMS), a NoSQL database technology, or any other appropriate technologies. The database may include a number of different types of data that are used by the present system, method, and computer software product.

As used herein, the term "processor" broadly refers to any unit, module, or machine capable of executing a sequence of instructions. The processor 32 shown in FIG. 2 and the process server 116 shown in FIG. 3 may be or include, for example and without limitation, a single-core or multi-core processor, a general purpose processor, a special purpose processor, a conventional processor, a Graphics Processing Unit (GPU), a digital signal processor (DSP), one or a plurality of microprocessors, one or more microprocessors associated with a DSP core, a controller, a microcontroller, one or more Application Specific Integrated Circuits (ASICs), one or more Field Programmable Gate Array (FPGA) circuits, any other type of integrated circuit (ID), a system-on-a-chip (SOC), a Complex Instruction Set Computer (CISC), a Reduced Instruction Set Computer (RISC), or a state machine.

The display device 40 that may be embodied in a client device 44 as shown in FIGS. 2 and 3 may be or include, for example and without limitation, a monitor or television display, a plasma display, a liquid crystal display (LCD), or a display based on a technology such as front or rear projection, light emitting diodes (LEDs), organic light-emitting diodes (OLEDS), or Digital Light Processing (DLP). The display device interface may operate using technology such as Video Graphics Array (VGA), Super VGA (S-VGA), Digital Visual Interface (DVI), High-Definition Multimedia Interface (HDMI), or any other appropriate technologies. A display device interface may be used to communicate display data from the processor 32 to the display device 40 to be displayed by the display device 40. The display device 40 may also be external to the client device 44 and coupled to the client device 44 via a display device interface.

The input device 42 that may be embodied in a client device 44 as shown in FIGS. 2 and 3 may be or include, for example and without limitation, a keyboard, mouse, trackball, pointing stick, touch screen, touch pad, stylus pad, or other suitable devices. The input device 42 may be configured to communicate with the processor 32 or the client device 44 using various peripheral device interface technologies, such as a Universal Serial Bus (USB), PS/2, Bluetooth, infrared, serial port, parallel port, or any other appropriate technologies.

The graphical user interface 50 shown in FIGS. 5A-9, 11-13B, and 16-19 may be displayed to the user via the display device 40, and more specifically through a web browser module. The web browser module may include or communicate with one or more sub-modules that perform functionality such as rendering HTML (including HTML5), rendering raster and/or vector graphics, executing JavaScript, and/or rendering multimedia content. The web browser module and its sub-modules may also implement technologies such as Rich Internet Application (RIA), Adobe Flash, Microsoft Silverlight, or any other appropriate multimedia technologies. These multimedia technologies may be implemented using one or more web browser plug-in modules and/or by using one or more sub-modules within the web browser module itself.

Figure 20:
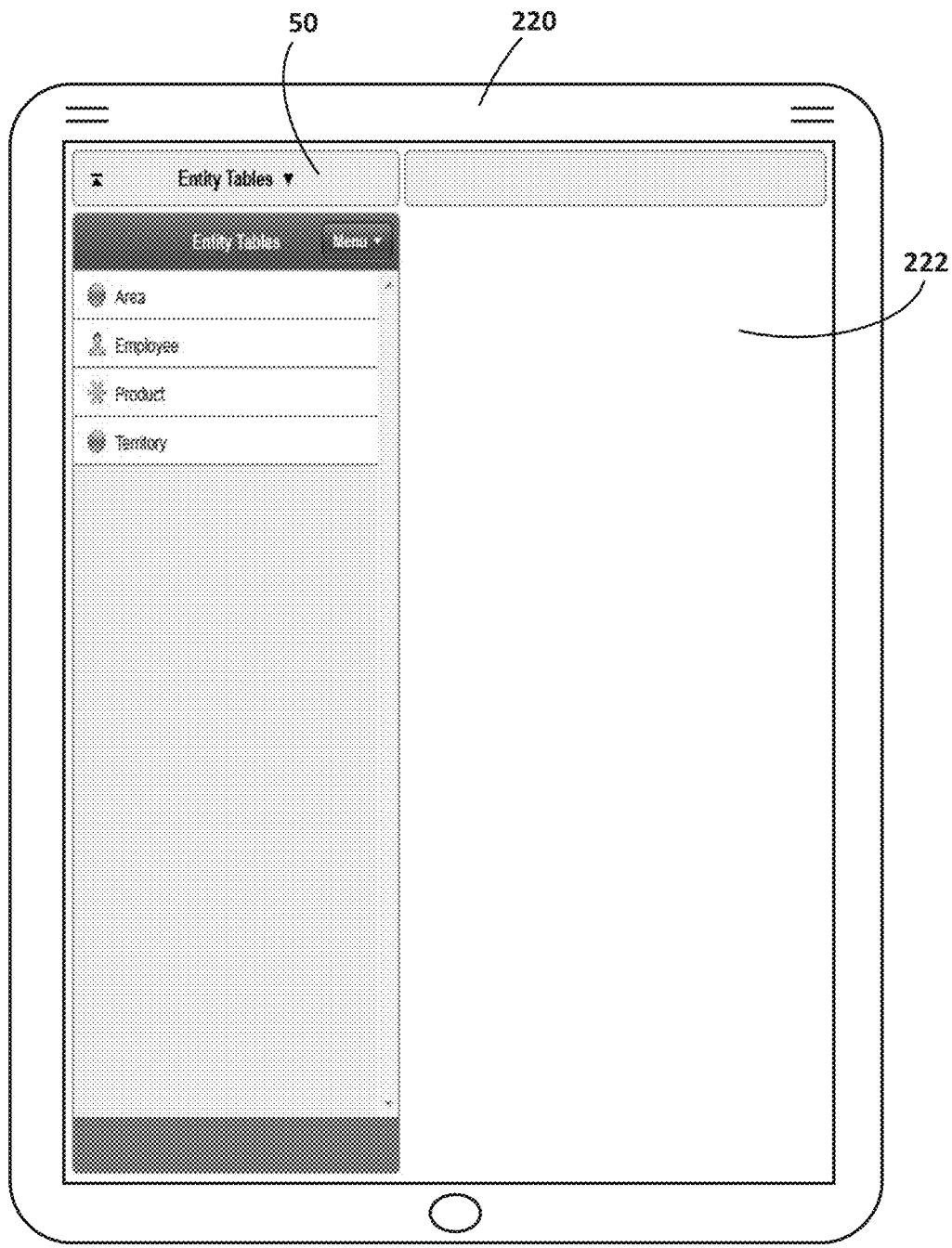
FIG. 20 is a tablet computer that may be utilized in the sales performance management systems of FIGS. 2 and 3.

The client device 44 shown in FIGS. 2 and 3 may be or include, for example and without limitation, a desktop computer, a laptop computer, a netbook, a tablet computer, a personal digital assistant (PDA), a cellular phone such as a smartphone, or any other appropriate device. The client device 44 may include the display device 40 and input device 42, as well as a processor, memory device, communication interface, peripheral device interface, display device interface, storage device, and various other components. FIG. 20 shows a tablet computer 220 that is a more specific example of the client device 44 of FIGS. 2 and 3. The tablet computer 220 may include a processor (not depicted), memory device (not depicted), storage device (not depicted), and touch screen display 222, which may possess characteristics of the display device 40 and input device 42, as described above with respect to FIGS. 2 and 3. The touch screen display 222 may receive user input using technology such as, for example and without limitation, resistive sensing technology, capacitive sensing technology, optical sensing technology, or any other appropriate touch-sensing technology. The touch screen display 222 may also be configured to display the graphical user interface 50, such as through a web browser interface.

Although the present method, system, and computer software product has been described using examples relating to sales performance management and sales compensation management, the features described above with respect to the present invention are also applicable to and may be used by, mutatis mutandis, any type of business organization, non-business organization, or individual for any suitable purpose.

Furthermore, while features and elements of the present method, system, and computer software product are described in particular combinations, it is to be appreciated that each feature or element can be used alone or in any combination with or without the other features and elements. Any single embodiment described herein may be supplemented with one or more elements from any one or more of the other embodiments described herein. Any single element of an embodiment may be replaced with one or more elements from any one or more of the other embodiments described herein. For example, each feature or element as described herein with reference to any one of FIGS. 1-20 may be used alone without the other features and elements or in various combinations with or without other features and elements from each or any combinations of the other figures from FIGS. 1-20. Each or any combination of features described herein with reference to FIGS. 1-20 may be considered optional. Sub-elements of the methods and features described herein may be performed in any arbitrary order (including concurrently) in any combination or sub-combination.

What is claimed is:

1. A computer-implemented method of representing and utilizing data related to a business unit in a sales performance management system, comprising the steps of:
   receiving a user input selecting an entity name representing the business unit;
   generating an entity table associated with the entity name and configured to store data related to the business unit in a storage device, the entity table having data fields including an explicit entity ID field and an internal entity ID field;
   populating the explicit entity ID field of the entity table with explicit entity ID values that each uniquely identifies an instance of the business unit, wherein no two explicit entity ID values are identical;
   generating a unique internal entity ID value for each one of the explicit entity ID values, wherein no two entity ID values are identical;
   associating each internal entity ID value with a corresponding one of the explicit entity ID values;
   storing the internal entity ID values in the internal entity ID field of the entity table;
   associating the entity table with a data table, separate from the entity table, such that at least one of the explicit entity ID values is displayed, but not stored, in an ID field of the data table via a display device, while the corresponding internal entity ID value associated with the at least one explicit entity ID value is stored in another ID field in the data table but is not displayed.

2. The computer-implemented method of claim 1, further comprising the steps of presenting a graphical user interface via the display device, and providing an input device configured to interact with the graphical user interface, wherein the step of populating the explicit entity ID field of the entity table includes receiving a data input via user interaction with the graphical user interface.

3. The computer-implemented method of claim 2, wherein the step of receiving a user input selecting an entity name includes displaying a list of predetermined entity names via the graphical user interface, and receiving a user selection from the list of predetermined entity names or a custom user-specified entity name via the input device.

4. The computer-implemented method of claim 2, wherein the step of associating the entity table with a data table includes the following steps:
   receiving a user input via the input device selecting the at least one explicit entity ID value to be displayed in the ID field of the data table;
   validating that the user selected at least one explicit entity ID value is a valid explicit entity ID value stored in the explicit entity ID field of the entity table;
   in a case that the user selected at least one explicit entity ID value is valid, displaying the user selected at least one explicit entity ID value in the ID field of the data table and storing the corresponding internal entity ID value associated with the at least one explicit entity ID value in the data table; and
   in a case that the user selected at least one explicit entity ID value is not valid, presenting an error message via the graphical user interface without storing any data in the data table.

5. The computer-implemented method of claim 1, wherein the data fields of the entity table further includes an entity attribute field, and further comprising the step of populating the entity attribute field with entity attribute values that are each associated with a corresponding one of the explicit entity ID values, each one of the entity attribute values containing data descriptive of an attribute of the instance of the business unit identified by the associated explicit entity ID value.

6. The computer-implemented method of claim 5, wherein the entity attribute field of the entity table comprises a plurality of entity attribute fields associated with the explicit entity ID field, each one of the plurality of entity attribute fields being configured to store data descriptive of a different attribute of each instance of the business unit.

7. The computer-implemented method of claim 5, wherein the graphical user interface includes a structure element configured to present guidance and receive user input related to the data fields of the entity table, the structure element including: a field details element configured to receive user input related to inclusion and naming of the data fields; a field options element configured to receive user input related to behavior of the data fields within the entity table; and a display fields element configured to receive user input related to display of the data fields in the data table associated with the entity able.

8. The computer-implemented method of claim 5, further comprising the steps of receiving a user input specifying the entity attribute field as a display field, and displaying the entity attribute values of the entity attribute field in an attribute field of the data table without storing the entity attribute values in the data table.

9. A system for representing and utilizing data related to a business unit in sales performance management, the system comprising:
a display device in communication with the processor and configured to present a graphical user interface;
an input device in communication with at least one of the processor, a storage device in communication with the processor, or the display device, wherein the processor is configured to execute software for:
receiving a user input from the input device selecting an entity name representing the business unit;
generating an entity table that is associated with the entity name and configured to store data related to the business unit in the storage device, the entity table having data fields including an explicit entity ID field and an internal entity ID field;
receiving a data input of explicit entity ID values that each uniquely identifies an instance of the business unit, wherein no two explicit entity ID values are identical, and to store the explicit entity ID values in the explicit entity ID field of the entity table;
generating a unique internal entity ID value for each one of the explicit entity ID values, and to associate each internal entity ID value with a corresponding one of the explicit entity ID values wherein no two entity ID values are identical;
storing the internal entity ID values in the internal entity ID field of the entity table; and
associating the entity table with a data table, separate from the entity table, wherein a user input selecting at least one explicit entity ID value is received via the input device, the user selected at least one explicit entity ID value being displayed, but not stored, in a first ID field of the data table via the display device, while the corresponding internal entity ID value associated with the user selected at least one explicit entity ID value is stored in a second ID field in the data table but is not displayed.

10. The system of claim 9, wherein the data fields of the entity table further includes an entity attribute field configured to store entity attribute values that are each associated with a corresponding one of the explicit entity ID values, each one of the entity attribute values containing data descriptive of an attribute of the instance of the business unit identified by the associated explicit entity ID value.

11. The system of claim 9, wherein the graphical user interface includes an entity selection element configured to display a list of predetermined entity names and receive the user input selecting an entity name, the user input being a selection from the list of predetermined entity or a custom user-specified entity name.

12. The system of claim 11, wherein the graphical user interface further includes a structure element configured to present guidance and receive user input related to the data fields of the entity table, the structure element including: a field details element configured to receive user input related to selection of the data fields; a field options element configured to receive user input related to behavior of the data fields within the entity table; and a display fields element configured to receive user input related to display of the data fields in the data table associated with the entity able.

13. The system of claim 12, wherein the entity selection element is presented in a left hand pane of the graphical user interface, and the structure element is presented in a right hand pane of the graphical user interface.

14. The system of claim 9, wherein the display device and the input device are part of a client computing device in communication with the processor and the storage device through a network connection.

15. The system of claim 14, wherein the processor and the storage device are part of a server system physically separated from the client computing device.

16. The system of claim 9, wherein the software further comprises a component configured to validate that the user selected at least on explicit entity ID value to be displayed in the first ID field of the data table is a valid explicit entity ID value stored in the explicit entity ID field of the entity table, where in a case that the user selected at least one explicit entity ID value is valid, displaying the user selected at least one explicit entity ID value in the first ID field of the data table and storing the corresponding internal entity ID value associated with the at least one explicit entity ID value in the data table, and where in a case that the user selected at least one explicit entity ID value is not valid, presenting an error message via the graphical user interface without storing any data in the data table.

17. The system of claim 9, wherein the data table is an assignment table that further includes a second ID field, and the user input selecting at least one explicit entity ID value includes a first explicit entity ID value that uniquely identifies an instance of the business unit, and a second explicit entity ID value that uniquely identifies an instance of a different business unit, the first and second explicit entity ID values being displayed via the display device in the first and second ID fields of the assignment table, respectively, and the corresponding internal entity ID values associated with the first and second explicit entity ID values being stored in the assignment table, to indicate an assignment relationship between the instances of the different business units.

18. The system of claim 9, wherein the data table is a hierarchy table that further includes a second ID field, and the user input selecting at least one explicit entity ID value includes a first explicit entity ID value that uniquely identifies a higher level instance of the business unit, and a second explicit entity ID value that uniquely identifies a lower level instance of the business unit, the first and second explicit entity ID values being displayed via the display device in the first and second ID fields of the hierarchy table, respectively, and the corresponding internal entity ID values associated with the first and second explicit entity ID values being stored in the hierarchy table, to indicate a hierarchical relationship between the higher level instance of the business unit and the lower level instance of the business unit.

19. The system of claim 9, wherein the data table is a hierarchy table that further includes a second ID field, and the user input selecting at least one explicit entity ID value includes a first explicit entity ID value that uniquely identifies an instance of the business unit, and a second explicit entity ID value that uniquely identifies an instance of a different lower level business unit, the first and second explicit entity ID values being displayed in the first and second ID fields of the hierarchy table, respectively, and the corresponding internal entity ID values associated with the first and second explicit entity ID values being stored in the hierarchy table, to indicate a hierarchy relationship between the instance of the business unit and the instance of the lower level business unit.

20. A computer software product that includes a non-transitory computer readable storage medium readable by a processor, the non-transitory computer readable storage medium having stored thereon a set of instructions for representing and utilizing data related to a business unit in a sales performance management system, the instructions comprising:

a first sequence of instructions which, when executed by the processor, causes the processor to receive a user input selecting an entity name representing the business unit;

a second sequence of instructions which, when executed by the processor, causes the processor to generate an entity table associated with the entity name and configured to store data related to the business unit in a storage device, the entity table having data fields including an explicit entity ID field and an internal entity ID field, wherein no two entity ID values are identical;

a third sequence of instructions which, when executed by the processor, causes the processor to populate the explicit entity ID field of the entity table with explicit entity ID values that each uniquely identifies an instance of the business unit, wherein no two explicit entity ID values are identical;

a fourth sequence of instructions which, when executed by the processor, causes the processor to generate a unique internal entity ID value for each one of the explicit entity ID values;

a fifth sequence of instructions which, when executed by the processor, causes the processor to associate each internal entity ID value with a corresponding one of the explicit entity ID values;

a sixth sequence of instructions which, when executed by the processor, causes the processor to store the internal entity ID values in the internal entity ID field of the entity table;

a seventh sequence of instructions which, when executed by the processor, causes the processor to associate the entity table with a data table, separate from the entity table, such that at least one of the explicit entity ID values is displayed, but not stored, in an ID field of the data table via a display device, while the corresponding internal entity ID value associated with the at least one explicit entity ID value is stored in another ID field of the data table, but is not displayed via the display device.

* * * * *